United States Patent
Wu et al.

(10) Patent No.: US 11,481,027 B2
(45) Date of Patent: Oct. 25, 2022

(54) PROCESSING A DOCUMENT THROUGH A PLURALITY OF INPUT MODALITIES

(71) Applicant: Microsoft Technology Licensing, LLC, Redmond, WA (US)

(72) Inventors: Yifan Wu, Redmond, WA (US); Benjamin Yan Sun, Redmond, WA (US); Ziwei He, Redmond, WA (US); Xiaoli Liu, Redmond, WA (US); Mingyang Xie, Redmond, WA (US); Zhaoyang Li, Redmond, WA (US); Weizhi Li, Redmond, WA (US); Qing Teng, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/955,034

(22) PCT Filed: Dec. 18, 2018

(86) PCT No.: PCT/US2018/066105
§ 371 (c)(1),
(2) Date: Jun. 17, 2020

(87) PCT Pub. No.: WO2019/139741
PCT Pub. Date: Jul. 18, 2019

(65) Prior Publication Data
US 2020/0379557 A1    Dec. 3, 2020

(30) Foreign Application Priority Data
Jan. 10, 2018 (CN) .......................... 201810022965.9

(51) Int. Cl.
*G06F 3/01* (2006.01)
*G06F 16/93* (2019.01)
(Continued)

(52) U.S. Cl.
CPC .......... *G06F 3/013* (2013.01); *G06F 3/04842* (2013.01); *G06F 3/167* (2013.01);
(Continued)

(58) Field of Classification Search
CPC ....................................................... G06F 3/01
See application file for complete search history.

(56) References Cited

U.S. PATENT DOCUMENTS 7,506,271 B2    3/2009 Wang et al.
9,026,939 B2    5/2015 Smus
(Continued)

FOREIGN PATENT DOCUMENTS

WO    9960465 A1    11/1999

OTHER PUBLICATIONS

"International Search Report and Written Opinion Issued in PCT Application No. PCT/US2018/066105", dated Apr. 12, 2019, 11 Pages.
(Continued)

*Primary Examiner* — James J Debrow
(74) *Attorney, Agent, or Firm* — Schwegman Lundberg & Woessner, P.A.

(57) ABSTRACT

The present disclosure provides method and apparatus for processing a document through a plurality of input modalities. A first input may be received, and input modality and type of the first input may be identified, wherein the type includes command and content. A second input may be received, and input modality and type of the second input may be identified. The document may be processed based at least on an identification result for the first input and an identification result for the second input.

11 Claims, 22 Drawing Sheets

(51) Int. Cl.
*G06F 40/103* (2020.01)
*G06F 40/166* (2020.01)
*G06F 3/04842* (2022.01)
*G06F 3/16* (2006.01)
*G06F 3/0354* (2013.01)
*G06F 3/04883* (2022.01)
*G06F 3/04886* (2022.01)

(52) U.S. Cl.
CPC ............ *G06F 16/93* (2019.01); *G06F 40/103* (2020.01); *G06F 40/166* (2020.01); *G06F 3/03545* (2013.01); *G06F 3/04883* (2013.01); *G06F 3/04886* (2013.01)

(56) References Cited

U.S. PATENT DOCUMENTS

| | | |
|---|---|---|
| 9,123,341 B2 | 9/2015 | Weng |
| 2002/0069058 A1 | 6/2002 | Jin et al. |
| 2003/0139932 A1* | 7/2003 | Shao et al. ............. G10L 21/00 |
| 2003/0233237 A1 | 12/2003 | Garside et al. |
| 2005/0128181 A1* | 6/2005 | Wang et al. ............ G06F 17/00 |
| 2007/0182595 A1 | 8/2007 | Ghasabian |
| 2007/0226635 A1* | 9/2007 | Goebel ................... G06F 17/00 |
| 2008/0155672 A1* | 6/2008 | Sharma .................. G06F 17/30 |
| 2010/0241431 A1* | 9/2010 | Weng et al. ............ G10L 15/18 |
| 2010/0281435 A1 | 11/2010 | Bangalore et al. |
| 2013/0046544 A1 | 2/2013 | Kay et al. |
| 2014/0022184 A1 | 1/2014 | Bathiche et al. |
| 2015/0363047 A1* | 12/2015 | Mathur ................. G06F 3/0481 |
| 2020/0379557 A1* | 12/2020 | Wu et al. ................. G06F 3/01 |

OTHER PUBLICATIONS

Perez, et al., "Two Strategies for Multimodal Fusion", In Proceedings of Multimodal Interaction for the Visualization and Exploration of Scientific Data, Oct. 4, 2005, 7 Pages.

"Office Action Issued in European Patent Application No. 18830671.6", dated Aug. 16, 2022, 7 Pages.

* cited by examiner

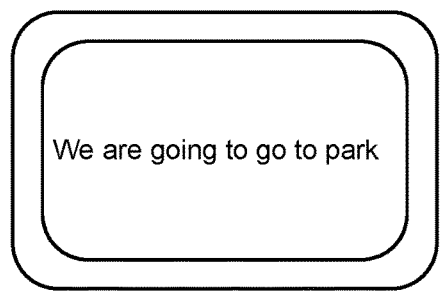
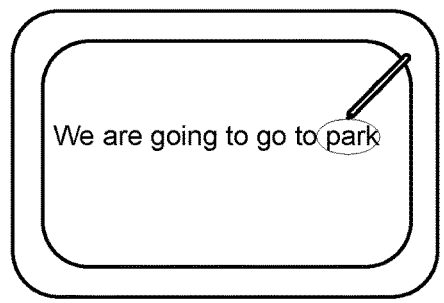
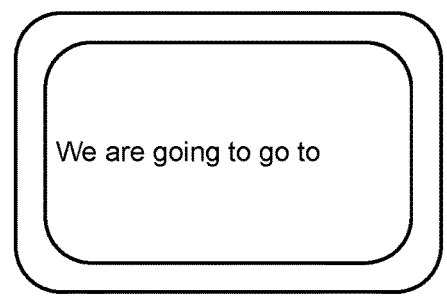
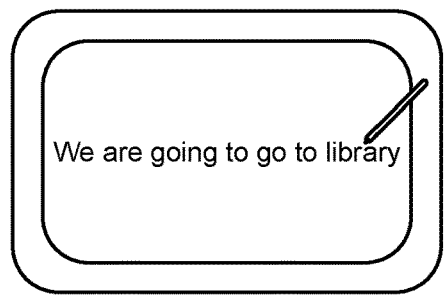
FIG.14

1810

Tomorrow is a sunny day.
Would you like to go out
and play with us?
We may go out by bike

to be inserted: we are going to go to park

1820

Tomorrow is a sunny day.
Would you like to go out
and play with us?
We may go out by bike

1830

Tomorrow is a sunny day.
Would you like to go out
and play with us?
We may go out by bike

1840

Tomorrow is a sunny day.
Would you like to go out
and play with us? We are
going to go to park.
We may go out by bike

*FIG.18*

2010

Tomorrow is a sunny day.
Would you like to go out
and play with us?
　We may go out by bike

2020

Tomorrow is a sunny day.
Would you like to go out
and play with us?
　We may go out by bike
ΔWe are going to go to park

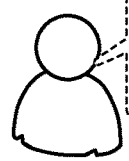

the inserting
location is at
the end of the
first paragraph

2030

Tomorrow is a sunny day.
Would you like to go out
and play with us?
　We may go out by bike
ΔWe are going to go to park

2040

Tomorrow is a sunny day.
Would you like to go out
and play with us? We are
going to go to park
　We may go out by bike

*FIG.20*

PROCESSING A DOCUMENT THROUGH A PLURALITY OF INPUT MODALITIES

CROSS-REFERENCE TO RELATED APPLICATION

This application is a U.S. National Stage Filing under 35 U.S.C. 371 of International Patent Application Serial No. PCT/US2018/066105, filed Dec. 18, 2018, and published as WO 2019/139741 A1 on Jul. 18, 2019, which claims priority to Chinese Application No. 201810022965.9, filed Jan. 10, 2018, which applications and publication are incorporated herein by reference in their entirety.

BACKGROUND

Electronic computing devices with touch screens are becoming more and more popular. For example, Tablet is becoming more and more popular due to its advantages such as lightweight, portable and so on. Tablet uses a touch screen as a basic input device, which allows a user to operate by in-built handwriting recognition, soft keyboard on the screen, speech recognition, etc., without a need of conventional keyboard or mouse.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for processing a document through a plurality of input modalities. A first input may be received, and input modality and type of the first input may be identified, wherein the type includes command and content. A second input may be received, and input modality and type of the second input may be identified. The document may be processed based at least on an identification result for the first input and an identification result for the second input.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

FIG. 14 illustrates an exemplary scenario implemented based on an exemplary method of FIG. 13 according to an embodiment.

FIG. 18 illustrates an exemplary scenario implemented based on an exemplary method of FIG. 17 according to an embodiment.

FIG. 20 illustrates an exemplary scenario implemented based on an exemplary method of FIG. 19 according to an embodiment.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Electronic computing device may support a plurality of input modalities. However, when electronic computing devices are used to process documents, a user is difficult to mix the plurality of input modalities freely. For example, when a user needs to use two or more kinds of input modalities to process document, a user needs to switch explicitly among them, which is not convenient and gives poor experience for the user.

The embodiments of the present disclosure propose processing documents effectively on electronic computing devices through a plurality of input modalities, wherein a user can switch among a plurality of input modalities freely without any particular operations. Document herein may refer to electronic files comprising various kinds of contents, such as word, image and so on. A plurality of input modalities herein comprise at least one or more of: finger input modality, pen input modality, voice input modality, soft-keyboard input modality and gaze input modality etc. Alternatively, a plurality of input modalities may also comprise various conventional input modalities, for example, keyboard input modality, and mouse input modality, and so on. For example, in a case of a user entering contents on a touch screen of an electronic computing device by using a pen currently, if the user wants to further enter a command or content by voice during writing contents through a pen or after completing to write the contents, then the user may directly speak the command or contents by voice at any desired time without performing any operation for switching to voice input modality. The command herein may comprise various document processing commands, comprising but not limited to, adding, deleting, replacing, adjusting format, adjusting location, adjusting layout, location indicating and so on. Based on the method of the present disclosure, a user may mix finger input modality, pen input modality, voice input modality, soft-keyboard input modality, gaze input modality, etc., freely through a smooth and nature way. Therefore, documents can be processed effectively and conveniently.

Figure 1:
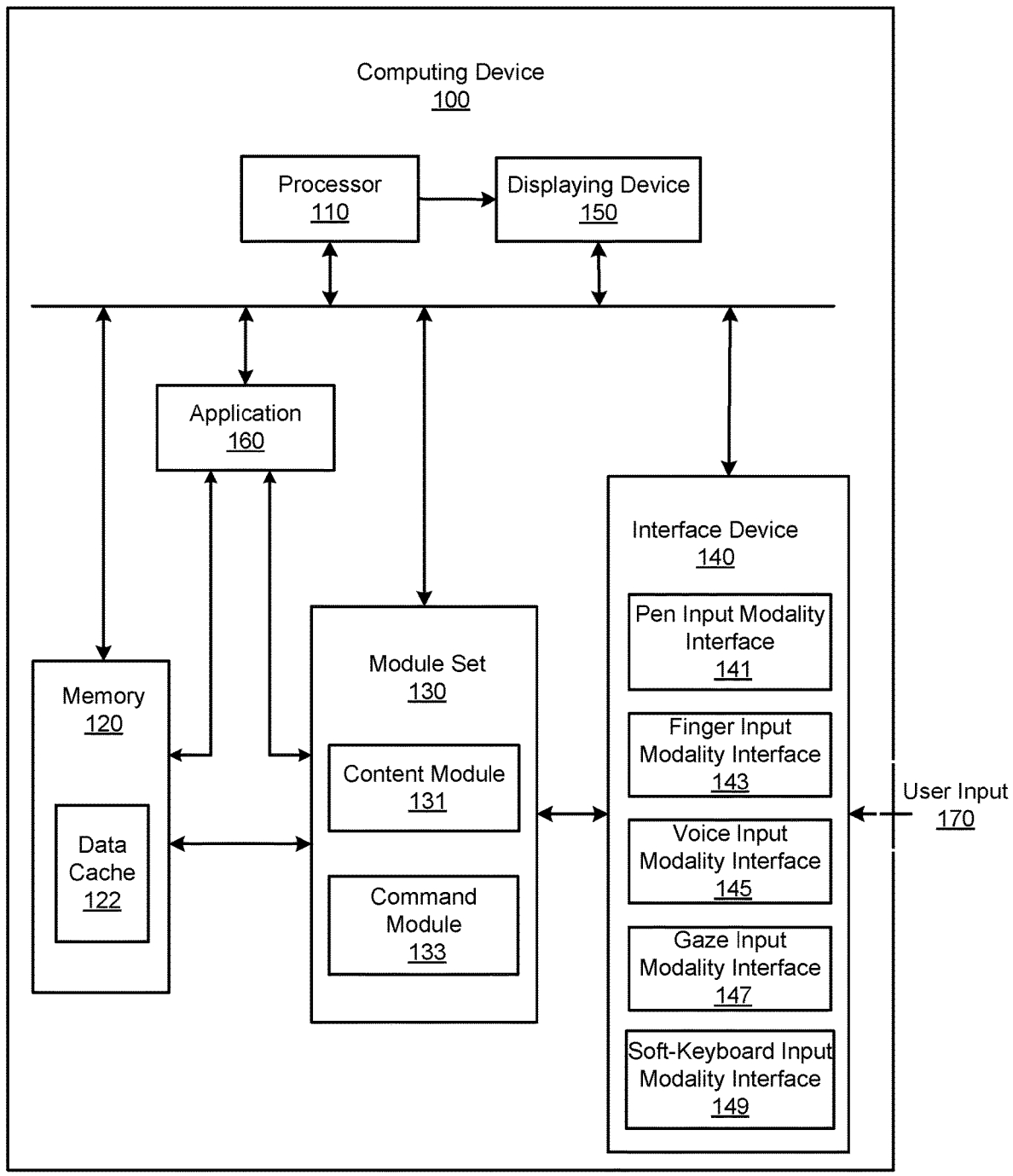
FIG. 1 illustrates an exemplary computing device according to an embodiment.

FIG. 1 illustrates an exemplary computing device 100 according to an embodiment. In FIG. 1, the computing device 100 may comprise a processor 110, a memory 120, a module set 130, an interface device 140, a displaying device 150 and/or an application 160. For example, the computing device 100 may be a notebook, a tablet computer, a smart phone, and so on. For simplicity, the embodiments of the present disclosure will be introduced through a tablet computer as an example below.

The processor 110 may execute various computer codes, program instruction, task, etc., stored in the memory 120. The processor 110 may connect with any other component of the computing device 100, to process information and/or data from other components, and so on.

The memory 120 may be one or more devices for storing data, which may comprise readable-only memory (ROM), random access memory (RAM), magnetic RAM, core memory, magnetic disk storage medium, optical storage medium, flash memory, and/or other machine readable medium for storing information. The term of "machine readable medium" may comprise but not be limited to portable or fixed storage, optical storage, wireless channel and various other medium for storing, containing or carrying instructions and/or data. The memory 120 may comprise a data cache 122, in which the data cache 122 may cache data processed by the processor, data entered from a user and data obtained from other devices, and so on.

The module set 130 may connect to the memory 120 and the interface device 140 and possible to the application 160.

The module set 130 may comprise a content module 131 and a command module 133. The module set 130 may obtain various user input from the interface device 140, and may feed the user input to the content module 131 or the command module 133 separately for processing, according to whether a type of the user input is contents or a command. The content module 131 may identify and process to various content inputted the user. The command module 133 may identify and process to various command inputted by the user. The content and command may be stored in the memory 120, for example, they may be stored in the data cache 122, or may provide the application 160 directly for usage.

The interface device 140 may connect to the module set 130, and may receive a user input 170 through a pen input modality interface 141, a finger input modality interface 143, a voice input modality interface 145, a gaze input modality interface 147 and a soft-keyboard input modality interface 149. As described above, a user input may utilize a plurality of input modalities, comprising but not limited to finger input modalities, pen input modalities, voice input modalities, soft-keyboard input modalities, and gaze input modalities, and so on. A user input utilizing different input modalities may be received by a corresponding interface in the interface device 140.

The displaying device 150 may connect to the processor 110, and may obtain data from the processor 110, to display on a display screen.

The application 160 may refer to various word or image edit application program, software, etc., which can process documents. The application 160 may perform operations on the documents based on content from the content module 131 and/or command from the command module 133. In one implementation, the content module 131 and the command module 133 may be also included in the application 160 in a form of component.

It should be understood that, all components or modules shown in FIG. 1 may be exemplary, and any components or modules in the computing device 100 may be added, deleting or replacing in FIG. 1 depending on specific application requirements.

Figure 2:
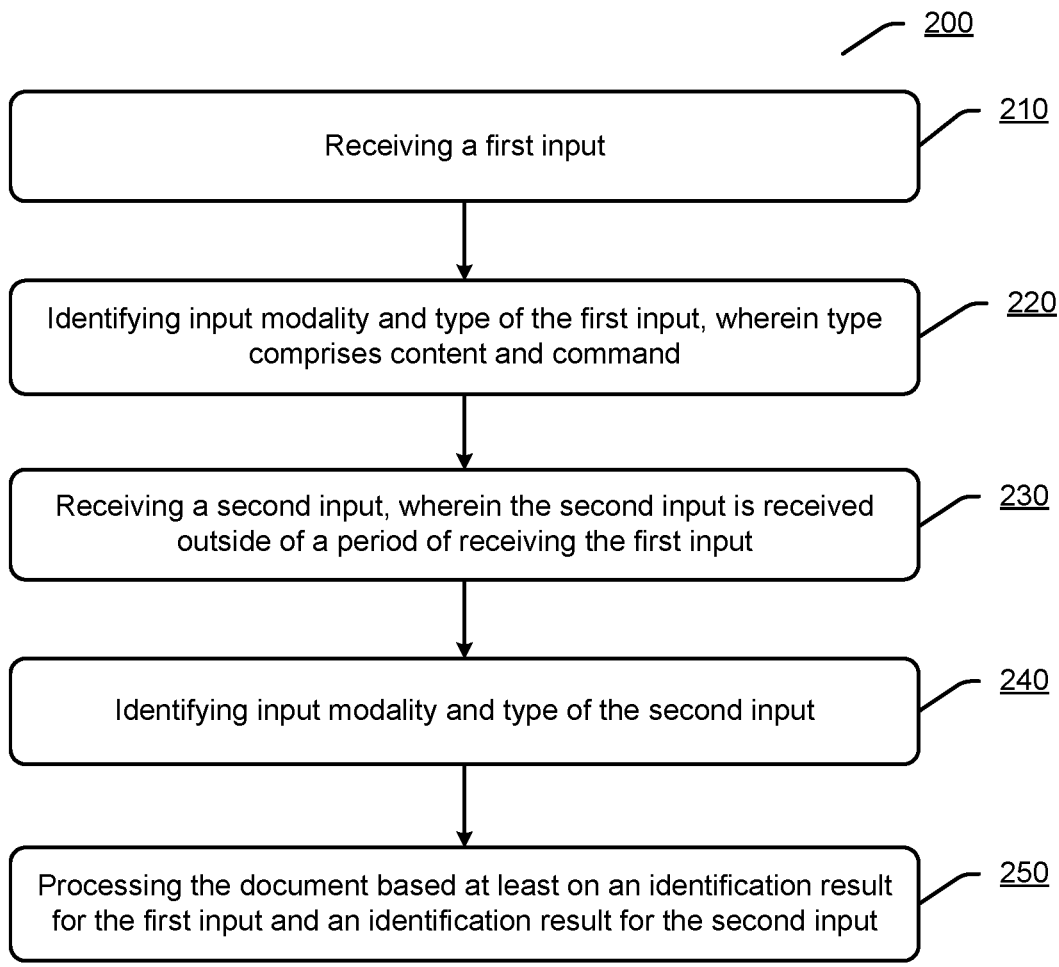
FIG. 2 illustrates a flowchart of an exemplary method for processing a document through a plurality of input modalities according to an embodiment.

FIG. 2 illustrates a flowchart of an exemplary method 200 for processing document through a plurality of input modalities according to an embodiment.

At 210, a first input may be received, in which the first input may be inputted to the computing device 100 through any one of a plurality of input modalities by a user.

At 220, the input modality and type of the first input may be identified. The type may comprise content and command type.

At 230, a second input may be received, in which the second input may be inputted to the computing device 100 through any one of a plurality of input modalities by a user. The second input may be received outside of a period of receiving the first input, for example, the second input may be received after receiving the first input.

At 240, input modality and type of the second input may be identified.

At 250, the document may be processed based at least on an identification result for the first input and an identification result for the second input, for example, creating a new document, and editing a current document, and so on.

Exemplary scenarios of FIG. 3 and FIG. 4 may be described below to facilitate understanding the exemplary method in FIG. 2.

Figure 3:
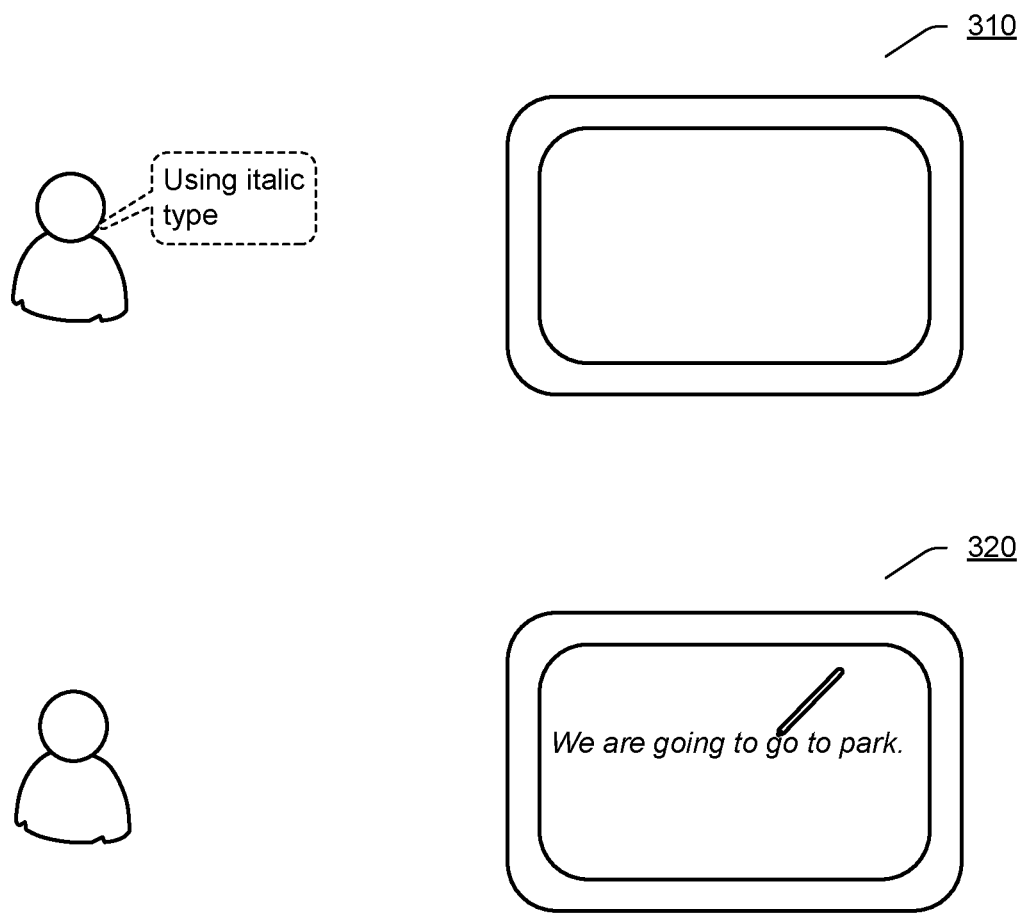
FIG. 3 illustrates an exemplary scenario implemented based on an exemplary method of FIG. 2 according to an embodiment.

FIG. 3 illustrates an exemplary scenario implemented based on an exemplary method of FIG. 2 according to an embodiment. In the exemplary scenario, a user may add new word content in a document created by the application 160.

At 310, a user may speak a sentence "using italic type" through voice to provide a first input. The computing device 100 may identify that the first input is inputted through voice input modality. The first input of "using italic type" may be received via the voice input modality interface 145 in FIG. 1. In this scenario, the computing device 100 may identify the type of the first input as command, for example, the first input indicating that a user wants to present a command to the content of a subsequent input by "italic type". It should be noted that, at 310, the user has not inputted other information on the computing device 100.

After providing the first input, the user may write "We are going to go to park" at 320 using a pen to provide a second input. The computing device 100 may identify that the second input is inputted through a pen input modality, and the second input "We are going to go to park" may be received via the pen input modality interface 141 in FIG. 1. In this scenario, the computing device 100 may identify the type of the second input as content, and thus set the whole content "We are going to go to park" subsequently inputted by the user to italic type based on the command "using italic type" inputted by the user previously, which may be presented on the displaying device 150, as shown at 320.

It should be appreciated that, the input modalities, type, content, and command, etc. shown in the scenario in FIG. 3 are exemplary. In other implementation, the first input may be also provided by the user through other input modalities, for example, pen input modality, finger input modality and so on, and the second input may be also provided through other input modalities by the user, for example, the voice input modality, the finger input modality, and so on. Further, depending on specific application requirements, a third input may be also received after receiving the second input. The third input may be any content or command inputted through any input modalities. For example, the third input may be command for adjusting location of content inputted through finger input modality, and so on.

Figure 4:
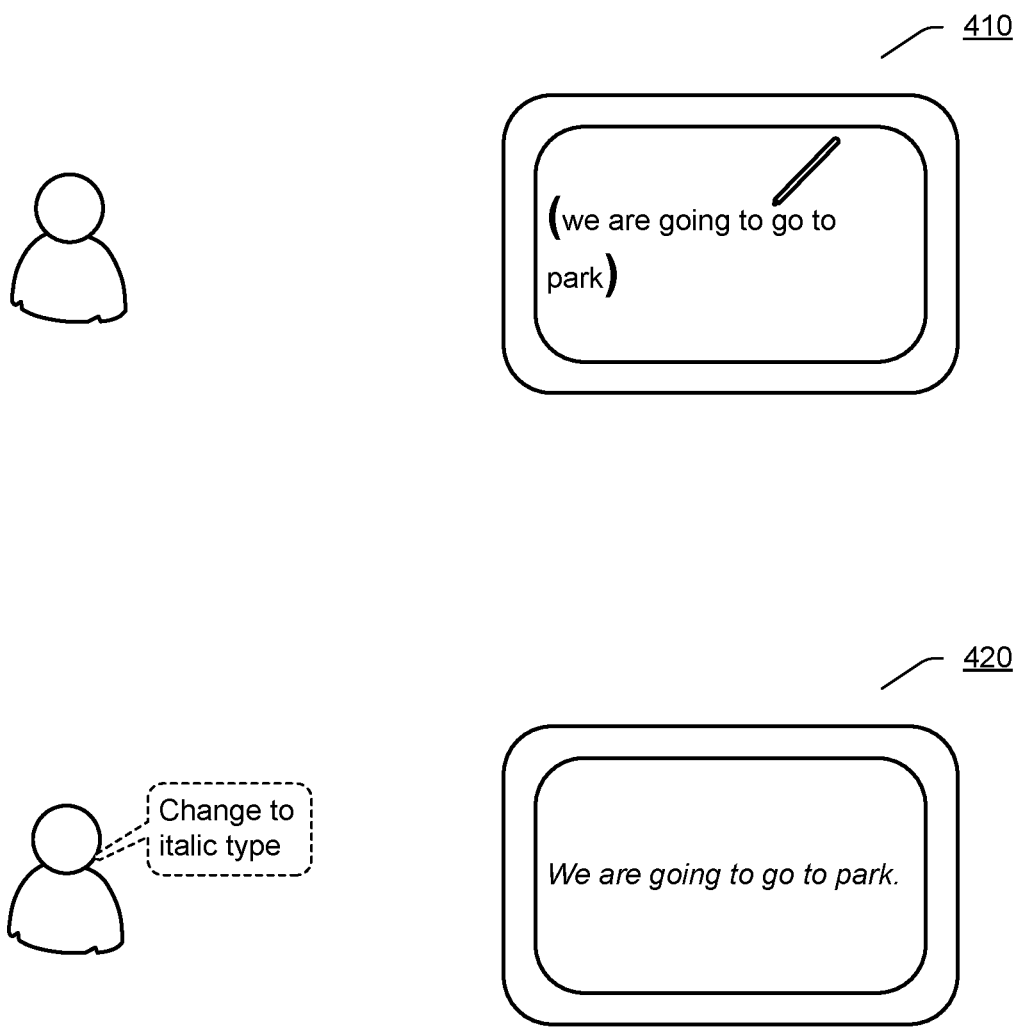
FIG. 4 illustrates an exemplary scenario implemented based on an exemplary method of FIG. 2 according to an embodiment.

FIG. 4 illustrates an exemplary scenario implemented based on the exemplary method of FIG. 2 according to an embodiment. In the exemplary scenario, the user may edit word content in a document created by the application 160.

At 410, the user may draw parentheses by pen in a first input, to select content "We are going to go to park" in a document. The computing device 100 may identify that the first input may be inputted through pen input modality, and may receive the first input via the pen input modality interface 141 of FIG. 1. In the scenario, the computing device 100 may identify the type of the first input as command, for example, a content selection command. The command may indicate a selection of content "We are going to go to park" in the document.

At 420, the user may speak "change to italic type" by voice to provide a second input. The computing device 100 may identify that the second input may be inputted through voice input modality, and receive the second input "change to italic type" via voice input modality interface 145 of FIG. 1. In the scenario, the computing device 100 may identify the type of the second input as command, for example, an edit command for adjusting format. Therefore, font form of the content "We are going to go to park" selected previously may be changed to italic type based on the command.

It should be appreciated that, input modalities, type, content, command, etc. shown in the scenario of FIG. 4 may be exemplary. In other implementations, the first input may be also provided by the user through other input modalities, for example, a voice input modality, a finger input modality, and so on, and the second input may be also provided by the user through other input modalities, for example, a pen input modality, a finger input modality, and so on. Further, depending on specific application requirements, a third input may be also received after receiving the second input. The third input may be any content or command inputted through any input modalities. For example, the third input may be a command for adjusting location of the content, and so on, which is inputted through the finger input modality.

Figure 5:
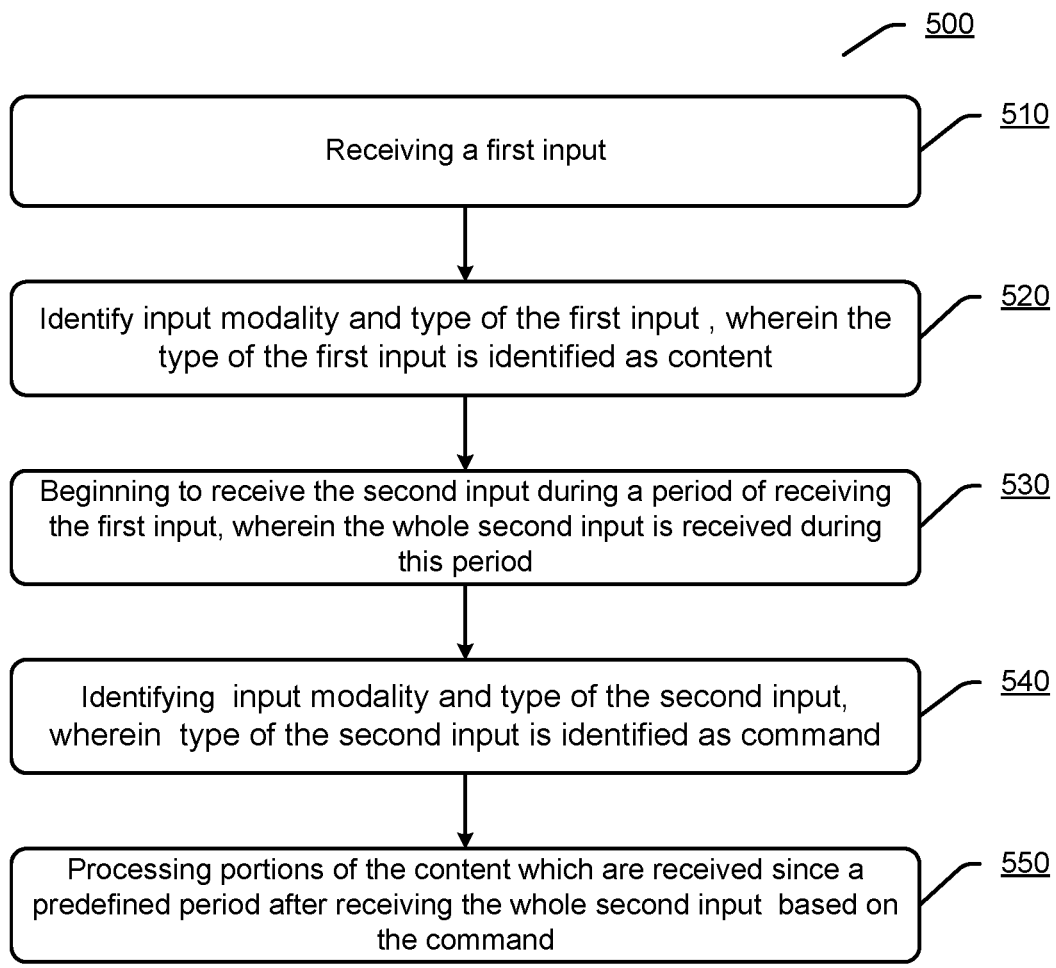
FIG. 5 illustrates a flowchart of an exemplary method for processing a document through a plurality of input modalities according to an embodiment.

FIG. 5 illustrates a flowchart of an exemplary method 500 for processing a document through a plurality of input modalities according to an embodiment.

At 510, a first input may be received, in which the first input may be inputted to the computing device 100 by a user through any one of the plurality of input modalities.

At 520, input modality and type of the first input may be identified. In the embodiment, type of the first input may be identified as content.

At 530, receiving the second input may be begun during a period of receiving the first input. The second input may be inputted to the computing device 100 by the user through any one of the plurality of input modalities, and the whole second input may be received during a period of receiving the first input.

At 540, input modality and type of the second input may be identified. In the embodiment, type of the second input may be identified as command.

At 550, portions of the content which are received since a predefined period after receiving the whole second input may be processed based on the command. The predefined period may be any preset time period, preferably, it may be between one and ten seconds, or it may be zero second.

Exemplary scenarios of FIG. 6 and FIG. 7 may be described below to facilitate to understand the exemplary method of FIG. 5.

Figure 6:
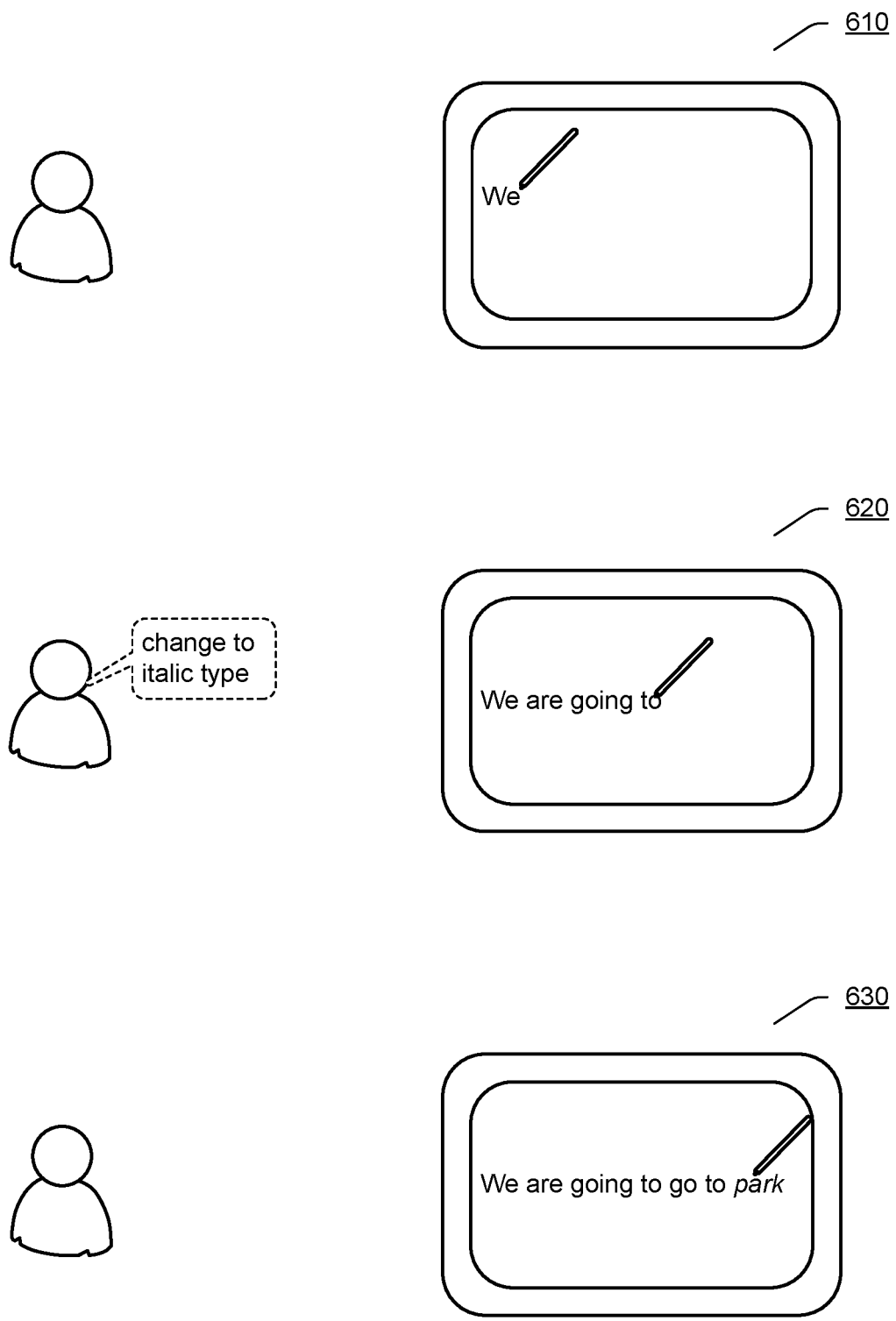
FIG. 6 illustrates an exemplary scenario implemented based on an exemplary method of FIG. 5 according to an embodiment.

FIG. 6 illustrates an exemplary scenario implemented based on an exemplary method of FIG. 5 according to an embodiment. In the exemplary scenario, a user may add new words content to a document created by the application 160. During the new words content being added into the document, a user may issue a command to subsequent words content at any time to make adjustment.

In the scenario, it is assumed that a user wants to input words "We are going to go to park" as a first input.

When a user writes a first part "We" of the first input by a pen at 610, the computing device 100 may identify that the first part of the first input may be inputted through pen input modality, and may receive the first input via pen input modality interface 141 in FIG. 1. In this scenario, type of the first input may be identified as content.

At this time, the user may want to change type of subsequent parts of the first input to italic type. Therefore, during the user continues to provide the first input, for example, during writing a second part "are going to" of the first input by pen, the user may speak "change to italic type" by voice to provide a second input, as shown at 620. The computing device 100 may identify that the second input is provided through voice input modality, and the second input may be received via the voice input modality interface 145 of FIG. 1. In the scenario, type of the second input may be identified as command, for example, an edit command for adjusting format. Herein, assuming that when the computing device 100 received the second part "are going to" of the first input, receiving of the whole second input may be completed.

The computing device 100 may begin to process the subsequent portions of the first input, according to the command indicated by the second input, since a predefined period after receiving the whole second input.

It is assumed that the user continues to write a third portion "go to" of the first input by pen during the predefined period, then the computing device 100 may begin to apply the command to the fourth portion "park" of the first input immediately after the predefined period, i.e., after the third portion of the first input; that is, setting type of "park" to italic type, as shown at 630.

It should be appreciated that, the length of the predefined period may be set depending on specific application requirements. When its length may be set short enough, it may begin to set the third portion "go to" of the first input to italic type.

Figure 7:
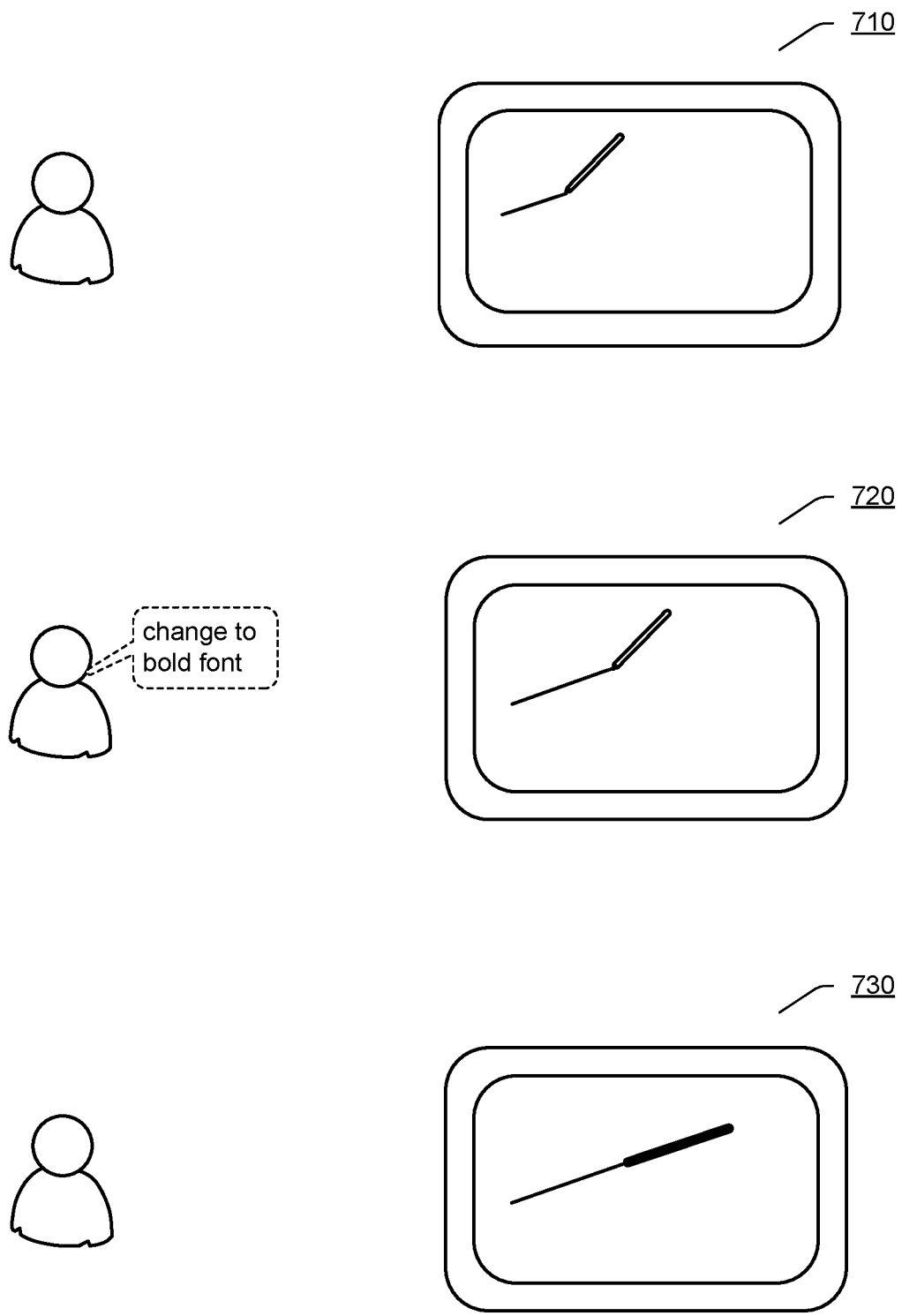
FIG. 7 illustrates an exemplary scenario implemented based on an exemplary method of FIG. 5 according to an embodiment.

FIG. 7 illustrates an exemplary scenario implemented based on an exemplary method of FIG. 5 according to an embodiment.

In the exemplary scenario, the user may add new image content in a document created by the application 160. During the new image content being added into the document, the user may issue a command to subsequent image content at any time to make adjustment.

In the scenario, assuming that the user may want to input a line segment as the first input.

When the user draws a first portion of a first input by pen, the computing device 100 may identify that the first portion of the first input may be provided through pen input modality, and the first input may be received via the pen input modality interface 141 of FIG. 1. In the scenario, type of the first input may be identified as content, such as line segment.

At this time, the user may want to change line of subsequent portions of the first input to bold font. Therefore, during the user continues to provide the first input, for example, during drawing a second portion of the first input by pen, the user may speak "change to bold font" by voice to provide a second input, as shown at 720. The computing device 100 may identify that the second input may be provided through voice input modality, and the second input may be received the voice input modality interface 145 via of FIG. 1. In this scenario, type of the second input may be identified as command, for example, an edit command for adjusting format. Herein, it is assumed that when the computing device 100 received a second portion of the first input, receiving of the whole second input may be completed.

The computing device 100 may begin to process subsequent portions of the first input according to the command indicated by the second input since a predefined period after receiving the whole second input. Since a predefined period after receiving the whole second input, it may be begun to process the subsequent portions of the first input according to a command indicated by the second input. As shown at 730, the computing device 100 may begin to apply the command to the subsequent portions of the first input after the predefined period; that is, beginning to change line of the line segment to bold.

It should be appreciated that, input modalities, type, content and command shown in the scenarios of FIG. 6 and FIG. 7 may be exemplary. In other implementations, the first input may be also provided by the user through other input modalities, for example, voice input modality and finger input modality, and so on. The second input may be also provided by the user through other input modalities, for example, pen input modality, and finger input modality, etc. Further, a third input may be received after receiving the second input depending on specific application requirements. The third input may be any content or command inputted through any input modalities. For example, the third input may be a command for adjusting location of the content inputted through finger input modalities, and so on.

Figure 8:
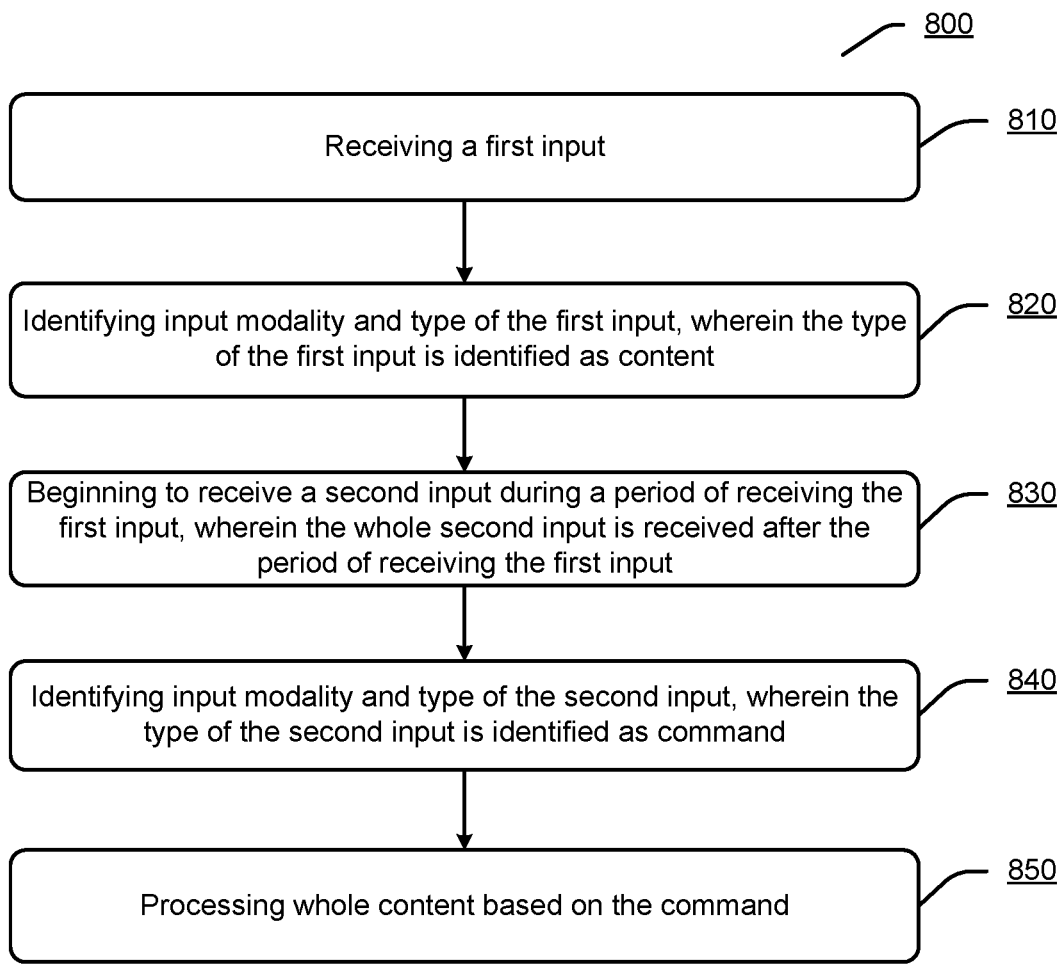
FIG. 8 illustrates a flowchart of an exemplary method for processing a document through a plurality of input modalities according to an embodiment.

FIG. 8 illustrates a flowchart of an exemplary method 800 for processing a document through a plurality of input modalities according to an embodiment At 810, a first input may be received, in which the first input may be inputted to the computing device 100 by a user through any one of a plurality of input modalities.

At 820, input modality and type of the first input may be identified. In this embodiment, the type of the first input may be identified as content.

At 830, it may be begun to receive a second input during a period of receiving the first input. The second input may be inputted to the computing device 100 by the user through any one of a plurality of input modalities, and the whole second input may be received after the period of receiving the first input.

At 840, input modality and type of the second input may be identified. In the embodiment, the type of the second input may be identified as command.

At 850, whole content may be processed based on the command.

Exemplary scenarios of FIG. 9 and FIG. 10 may be described below to facilitate to understand the exemplary method of FIG. 8.

Figure 9:
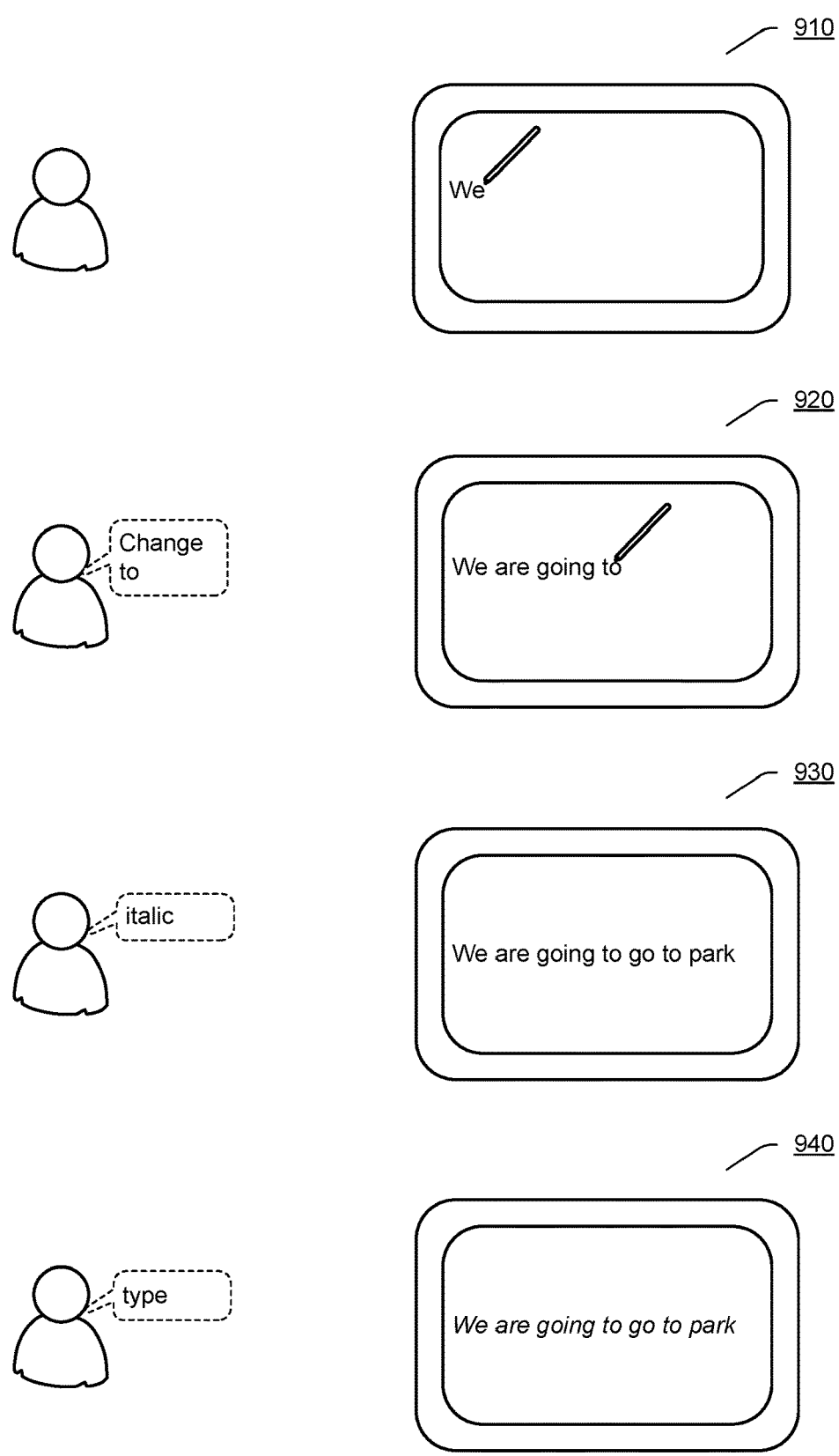
FIG. 9 illustrates an exemplary scenario implemented based on an exemplary method of FIG. 8 according to an embodiment.

FIG. 9 illustrates an exemplary scenario implemented based on an exemplary method of FIG. 8 according to an embodiment. In this exemplary scenario, a user may add new word content to a document created by the application 160. During the new word content being added to the document, the user may issue a command to the whole word content at any time to make adjustment.

In the scenario, it is assumed that the user wants to input words "We are going to go to park" as a first input.

When the user writes a first portion "We" of the first input by pen at 910, the computing device 100 may identify that the first portion of the first input may be inputted through pen input modality, and the first input may be received via the pen input modality interface 141 of FIG. 1.

At this time, the user may want to change the type of the first input to italic type. Therefore, when the user continues the first input, for example, when beginning to write a second portion "are going to" of the first input by pen, the user may begin to speak "change to" by voice to provide a first portion of a second input, as shown at 920. The computing device 100 may identify that the second input is inputted through voice input modality, and the second input may be received via the voice input modality interface 145 of FIG. 1.

At 930, the computing device 100 may continue to receive a second portion "italic" of the second input via the voice input modality interface 145 of FIG. 1. Meanwhile, the computing device 100 may continue to receive a third portion "go to park" of the first input, and may determine that the user has complete the whole first input "We are going to go to park" through pen input modality. For example, the completion of the first input may be based on the following conditions: since a predefined period from the pen moving from a touch screen, or the user does not continuing to write since a predefined period after writing the third portion "go to park" of the first input. The above determination conditions are merely exemplary but not limitation and the computing device 100 may also determine whether the user completes the whole first input based on any other preset condition. In this scenario, type of the first input may be identified as content.

At 940, after receiving the whole first input, the computing device 100 may continue to receive a third portion "type" of the second input via the voice input modality interface 145 of FIG. 1, and may determine that the user has complete the whole second input through voice input modality. For example, completion of the second input may be determined based on the following conditions: the user does not continue to speak since a predefined period after speaking the third portion "type" of the second input; or the user may speak concluding remarks indicating the completion of input, for example, "ending", "OK", and so on. The above determination conditions are merely exemplary but not limitation and the computing device may also determine whether the user completes the whole second input based on any other preset condition. In this scenario, type of the second input may be identified as command, for example, an edit command for adjusting format. Therefore, the computing device 100 may change the font form of the whole first input "We are going to go to park" to italic type based on the received whole command "change to italic type".

Figure 10:
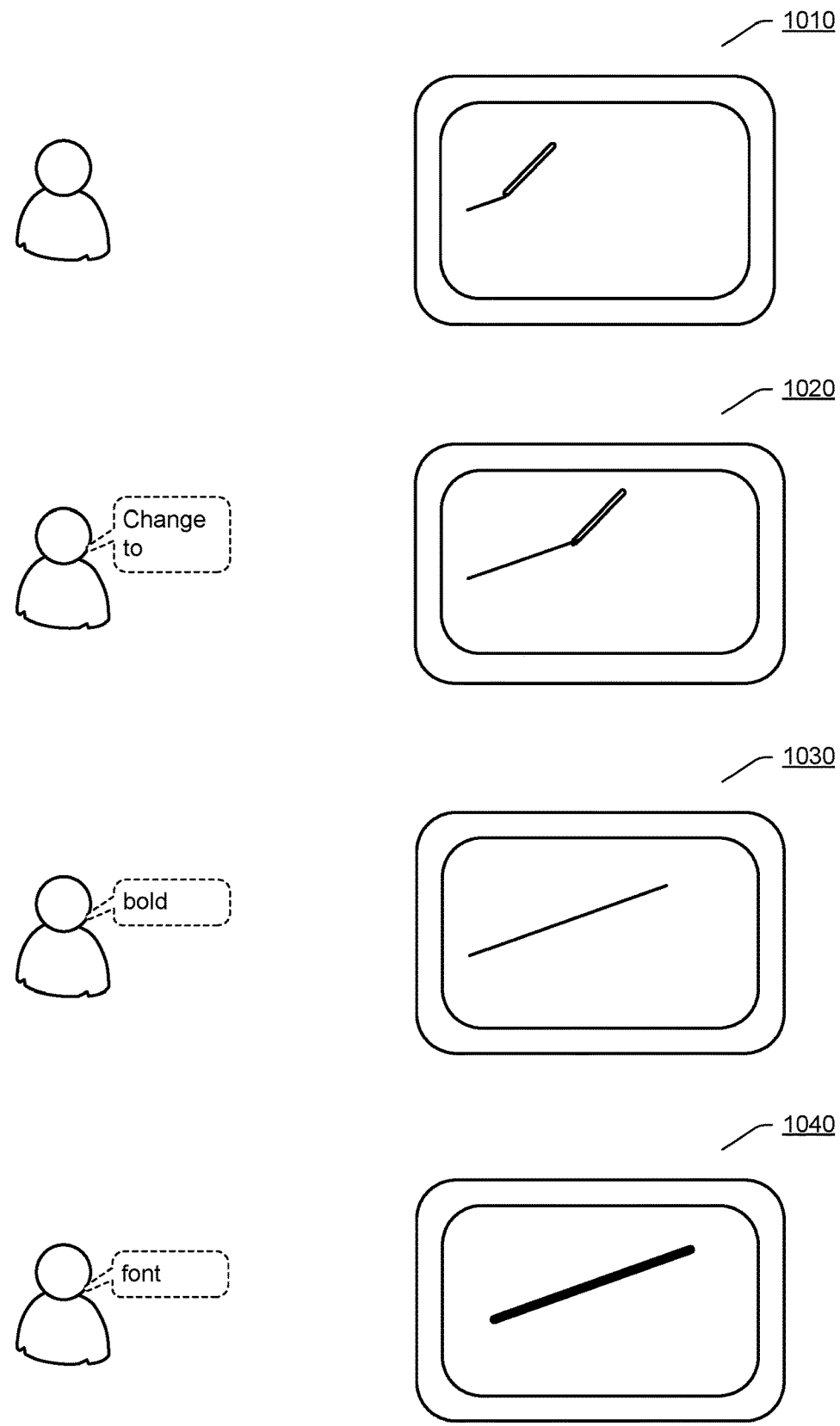
FIG. 10 illustrates an exemplary scenario implemented based on an exemplary method of FIG. 8 according to an embodiment.

FIG. 10 illustrates an exemplary scenario implemented based on an exemplary method of FIG. 8 according to an embodiment. In the exemplary scenario, the user may add new image content in the document created by the application 160, and the user may issue a command to the whole image content at any time to make adjustment during the new image content being added into the document.

In this scenario, it is assumed that the user wants to input a line segment as the first input.

When the user draws a first portion of the first input by pen at 1010, the computing device 100 may identify that the first portion of the first input is inputted through pen input modality, and the first input is received via the pen input modality interface 141 of FIG. 1.

At this time, the user may want to change type of the first input to bold font. Therefore, when the user continues to provide the first input, for example, continuing to draw a second portion of the first input by pen, the user may begin to speak "change to" by voice to provide a first portion of a second input, as shown at 1020. The computing device 100 may identify that the second input is inputted through voice input modality, and the second input may be received via the voice input modality interface 145 of FIG. 1.

At 1030, the computing device 100 may continue to receive a second portion "bold" of the second input via the voice input modality interface 145 of FIG. 1. Meanwhile, the computing device 100 may continue to receive a third portion of the first input, and may determine that the user has completed the whole first input through pen input modality, that is, drawing a whole line segment. For example, the completion of the first input may be based on the following conditions: since a predefined period from the pen moving from a touch screen, or the user does not continuing to draw line segments since a predefined period after drawing the third portion of the first input. The above determination conditions are merely exemplary but not limitation and the computing device 100 may also determine whether the user completes the whole first input based on any other preset condition. In this scenario, type of the first input may be identified as content, for example, a line segment.

At 1040, after having received the whole first input, the computing device 100 may continue to receive a third portion "font" of the second input via the voice input modality interface 145 of FIG. 1, and may determine that the user has completed the whole second input through voice input modality. For example, completion of the second input may be determined based on the following conditions: the user does not continue to speak since a predefined period after speaking the third portion "font" of the second input; or the user may speak concluding remarks indicating the completion of input, for example, "ending", "OK", and so on. The above determination conditions are merely exemplary but not limitation and the computing device may also determine whether the user completes the whole second input based on any other preset condition. In this scenario, type of the second input may be identified as command, for example, an edit command for adjusting format. Therefore, the computing device 100 may change the font form of the whole first input "We are going to go to park" to italic type based on the received whole command "change to italic type".

In this scenario, type of the second input may be identified as command, for example, an edit command for adjusting format. Therefore, the computing device 100 may change the form of line segment of the whole first input to bold font based on the received whole command "change to bold font".

It should be appreciated that, input modalities, type, content, command shown in scenarios of FIG. 9 and FIG. 10 are exemplary. In other implementations, the first input may be also inputted by a user through other input modalities, for example voice input modality, and finger input modality and so on. The second input may be also inputted by a user through other input modalities, for example, pen input modality, and finger input modality and so on. Further, depending on specific application requirements, a third input may be received after receiving the second input. The third input may be any content or command inputted through any input modalities. For example, the third input may be a command for adjusting location of content inputted through finger input modality.

Figure 11:
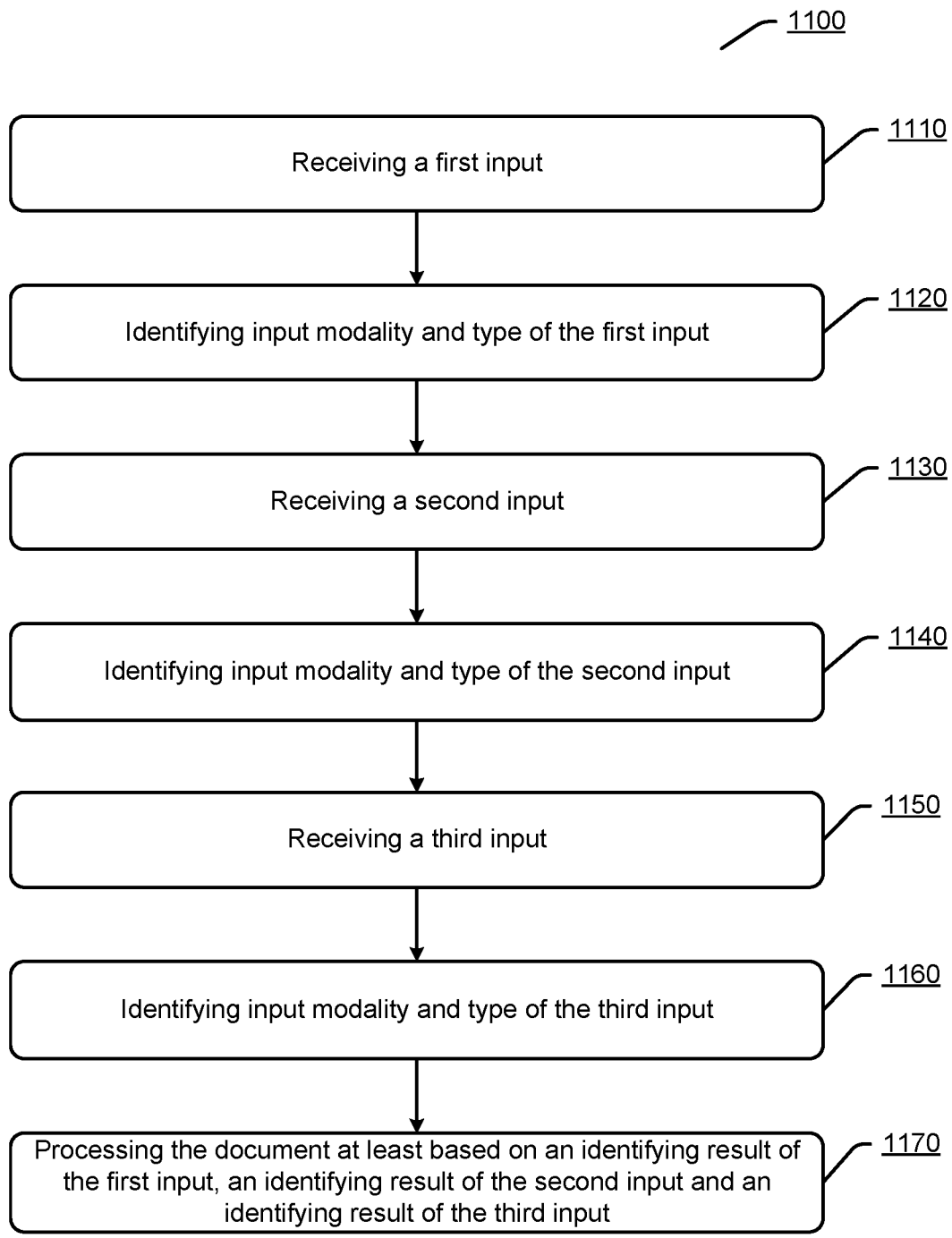
FIG. 11 illustrates a flowchart of an exemplary method for processing a document through a plurality of input modalities according to an embodiment.

FIG. 11 illustrates a flowchart of an exemplary method 1100 for processing a document through a plurality of input modalities according to an embodiment.

At 1110, a first input may be received, in which the first input may be inputted by a user to the computing device 100 through any one of a plurality of input modalities.

At 1120, input modality and type of the first input may be identified. The type may comprise content and command types.

At 1130, a second input may be received, in which the second input may be inputted by the user to the computing device 100 through any one of a plurality of input modalities.

At 1140, input modality and type of the second input may be identified.

At 1150, a third input may be received, in which the third input may be inputted by the user to the computing device 100 through any one of a plurality of input modalities.

At 1160, input modality and type of the third input may be identified.

At 1170, the document may be processed at least based on an identifying result of the first input, an identifying result of the second input and an identifying result of the third input.

In the exemplary method, depending on specific application requirements, a user may provide a first input, a second input and a third input in their order, and may also begin to provide a second input and a third input during providing a first input, and so on. The method of FIG. 11 may be described below in FIG. 12, as an example of a user beginning to provide a second input and a third input during providing a first input.

Figure 12:
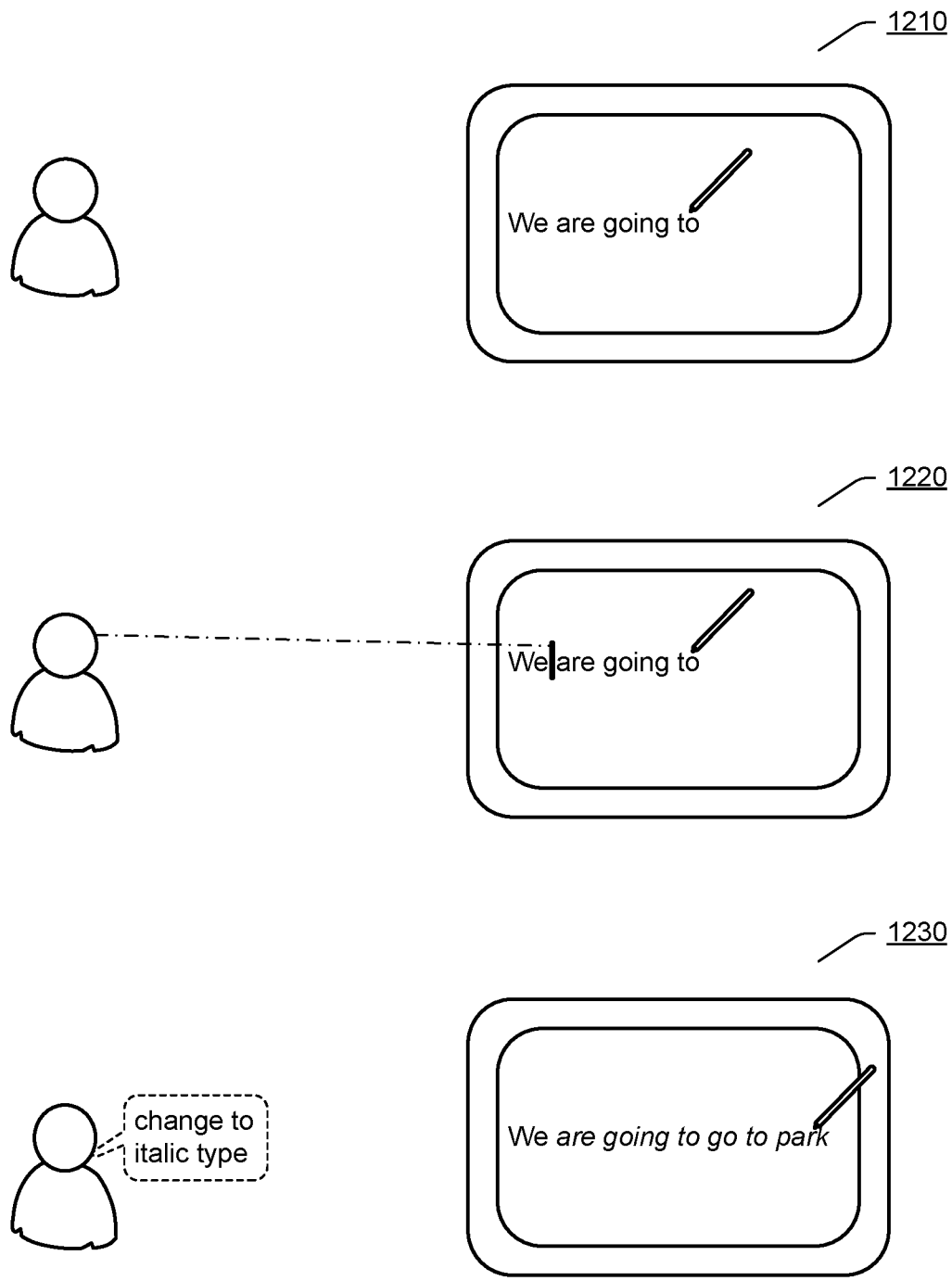
FIG. 12 illustrates an exemplary scenario implemented based on an exemplary method of FIG. 11 according to an embodiment.

FIG. 12 illustrates an exemplary scenario implemented based on an exemplary method of FIG. 11 according to an embodiment. In the exemplary scenario, a user may add new word content in a document created by the application 160. The user may issue a command to the new word content at any time for making adjustment during the new word content being added into the document.

At 1210, when the user writes a first portion "We are going to" of a first input by pen, the computing device 100 may identify that the first portions of the first input may be inputted through pen input modality, and the first input may be received via the pen input modality interface 141 of FIG. 1.

At 1220, the user may continue to write a second part "go to" of the first input by pen. While the user inputs "go to", the user may want to change font form of portions in the first input from "are going to", and thus may provide a second input through gaze input to indicate location of the portions in the first input whose font form are began to be changed. The computing device 100 may identify that the second input is inputted through gaze input modality, and the second input may be received via the gaze input modality interface 147 of FIG. 1. In the scenario, type of the first input may be identified as content, and type of the second input may be identified as command, for example, a location indication command for indicating a location between "We" and "are going to".

At 1230, the user may continue to write a third portion "go to park" of the first input by pen, while the user may speak "change to italic type" by voice, to provide a third input. At this time, the user may continue to provide the first input and optionally, may finish writing. The computing device 100 may identify that the third input is inputted through voice input modality, and the third input may be received via the voice input modality interface 145 of FIG. 1. In this scenario, type of the third input may be identified as command, for example, an edit command for adjusting format. Therefore, the computing device 100 may change font form of content "going to go to park" followed a location indicated by the location indication command to italic type based on the indicated location and an edit command of "change to italic type".

It should be appreciated that, input modalities, type, content, command shown in scenario of FIG. 12 are exemplary, and may be replaced at random in other implementations.

Figure 13:
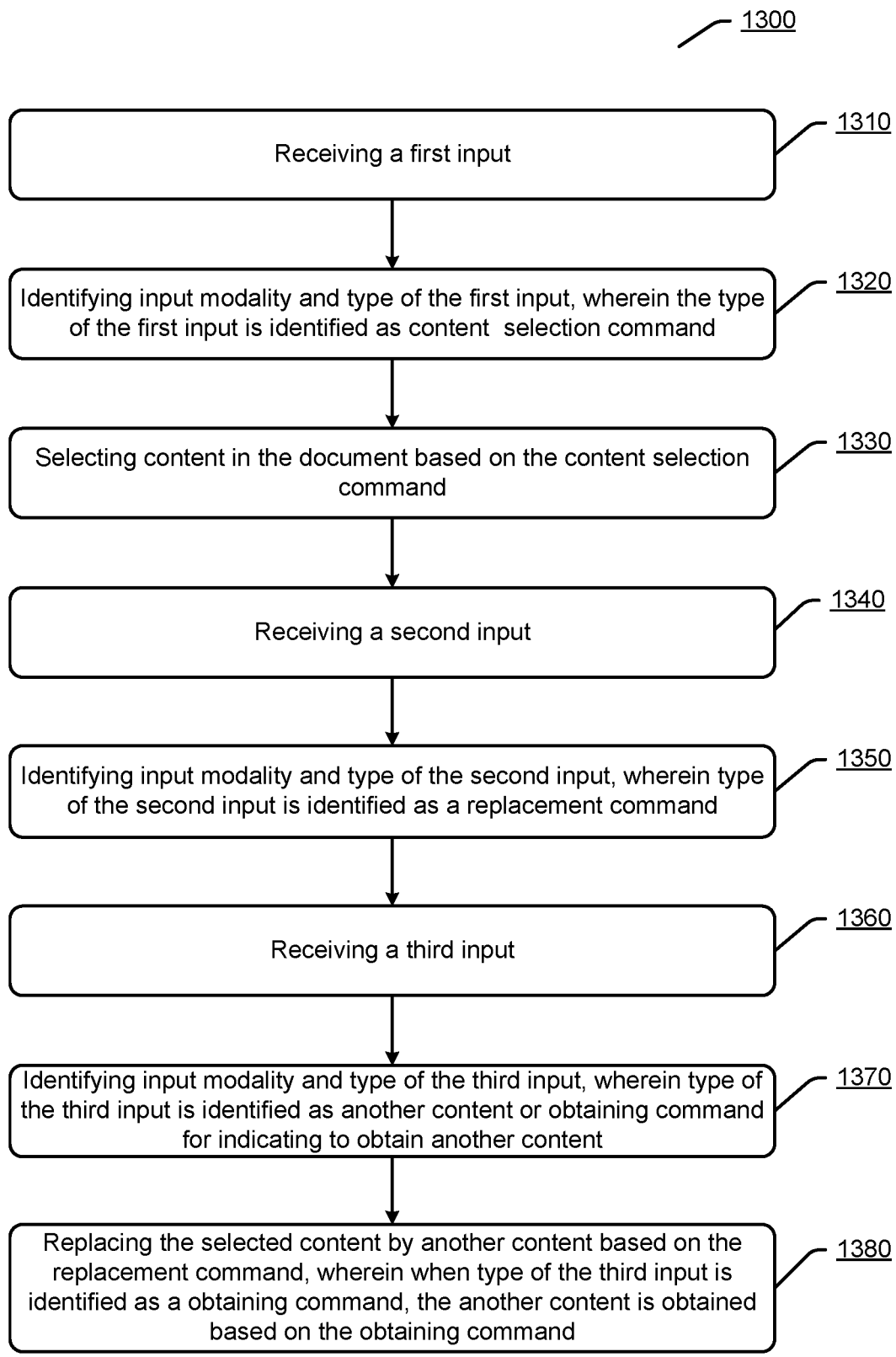
FIG. 13 illustrates a flowchart of an exemplary method for processing a document through a plurality of input modalities according to an embodiment.

FIG. 13 illustrates a flowchart of an exemplary method 1300 for processing a document through a plurality of input modalities according to an embodiment.

At 1310, a first input may be received, in which the first input may be inputted to the computing device 100 by a user through any one of a plurality of input modalities.

At 1320, input modality and type of the first input may be identified. In the embodiment, type of the first input may be identified as a content selection command.

At 1330, content in the document may be selected based on the identified content selection command.

At 1340, a second input may be received, in which the second input may be inputted to the computing device 100 by the user through any one of a plurality of input modalities.

At 1350, input modality and type of the second input may be identified. In this embodiment, type of the second input may be identified as a replacement command.

At 1360, a third input may be received, in which the third input may be inputted to the computing device 100 by the user through any one of a plurality of input modalities.

At 1370, input modality and type of the third input may be identified. In this embodiment, type of the third input may be identified as another content or obtaining command for indicating to obtain another content.

At 1380, the selected content may be replaced by another content based on the replacement command. When type of the third input may be identified as a obtaining command, the another content may be obtained based on the obtaining command.

FIG. 14 illustrates an exemplary scenario implemented based on an exemplary method of FIG. 13 according to an embodiment. In this exemplary scenario, the user may edit word content in a document created by the application 160, for example, replacing the selected content in the document.

At 1410, it may present content "We are going to go to park" existed in the current document.

At 1420, the user may draw a circle on the content "park" by pen as a first input, to select the content. The computing device 100 may identify that the first input may be inputted through pen input modality, and the first input may be received via the pen input modality interface 141 of FIG. 1. In this scenario, type of the first input may be identified as a content selection command.

At 1430, the user may speak "replace" by voice as a second input. The computing device 100 may identify that the second input may be inputted through voice input modality, and the second input may be received via the voice input modality interface 145 of FIG. 1. In this scenario, type of the second input may be identified as command, for example, a replacement command for replacing the selected content to another content. In response to identifying the replacement command, the computing device 100 may delete the selected content "park" from the document.

At 1440, the user may write "library" by pen as a third input. The computing device 100 may identify that the third input may be inputted through pen input modality, and the third input may be received via the pen input modality interface 141 of FIG. 1. In this scenario, type of the third input may be identified as another content for replacing the selected content. Therefore, the computing device 100 may replace the selected content "park" by another content "library" based on the replacement command.

Alternatively, the third input may be an obtaining command for indicating to obtain another content, for example, a paste command for indicating to obtaining another content from a pasteboard. In this situation, the computing device 100 may obtain another content based on the obtaining command, for example, obtaining another content "library" from the pasteboard, and replace the selected content "park" with the obtained another content "library" based on the replacement command.

It should be appreciated that, input modalities, type, content, command etc., shown in scenario of FIG. 14 are exemplary, and may be replaced at random in other implementations.

Figure 15:
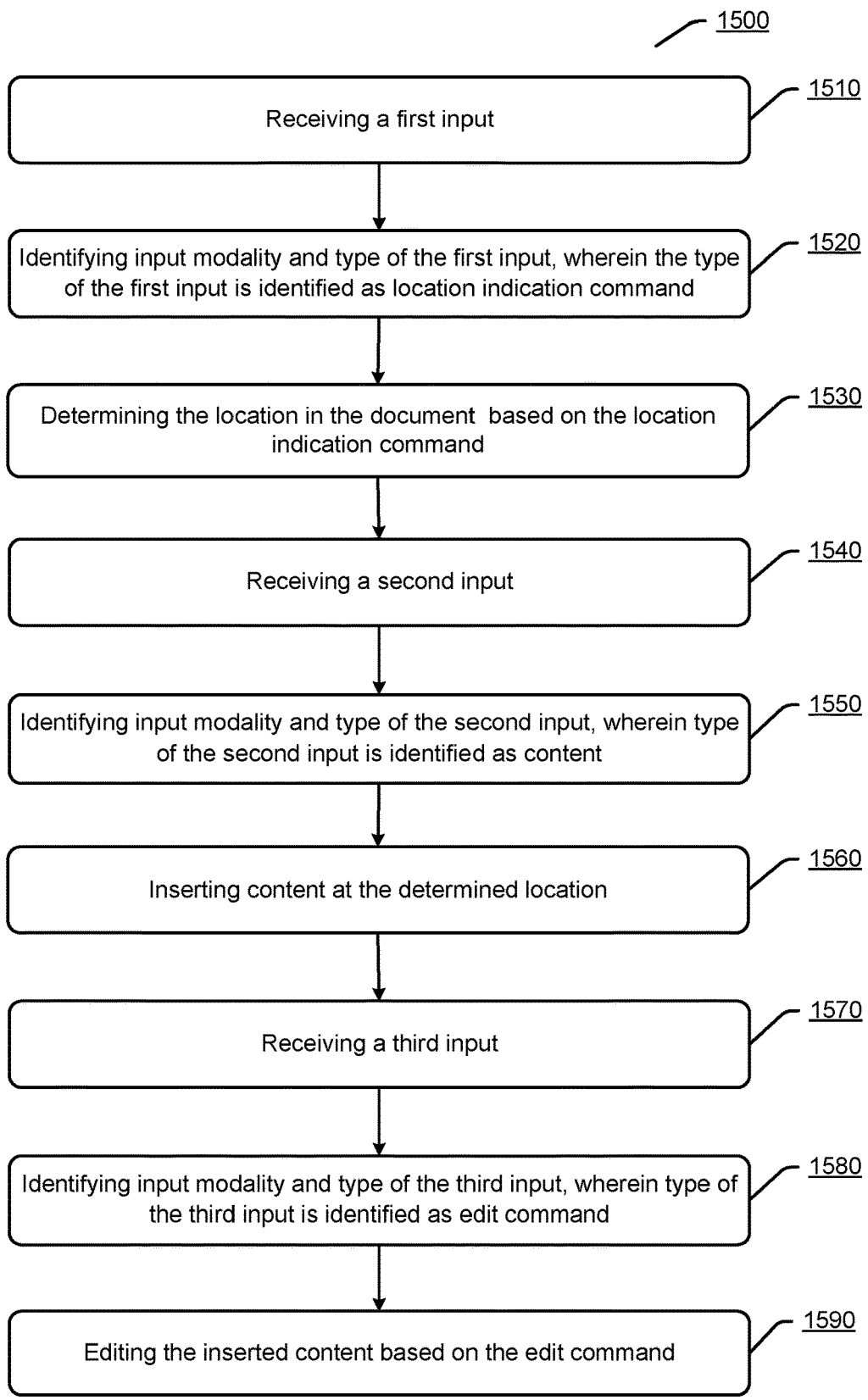
FIG. 15 illustrates a flowchart of an exemplary method for processing a document through a plurality of input modalities according to an embodiment.

FIG. 15 illustrates a flowchart of an exemplary method 1500 for processing a document through a plurality of input modalities according to an embodiment.

At 1510, a first input may be received, in which the first input may be inputted to the computing device 100 by a user through any one of a plurality of input modalities.

At 1520, input modality and type of the first input may be identified. In this embodiment, type of the first input may be identified as location indication command.

At 1530, the location in the document may be determined based on the location indication command.

At 1540, a second input may be received, in which the second input may be inputted to the computing device 100 by the user through any one of a plurality of input modalities.

At 1550, input modality and type of the second input may be identified. In this embodiment, type of the second input may be identified as content.

At 1560, content may be inserted at the determined location.

At 1570, a third input may be received, in which the third input may be inputted to the computing device 100 by the user through any one of the plurality of input modalities.

At 1580, input modality and type of the third input may be identified. In this embodiment, type of the third input may be identified as edit command.

At 1590, the inserted content may be edited based on the edit command.

Figure 16:
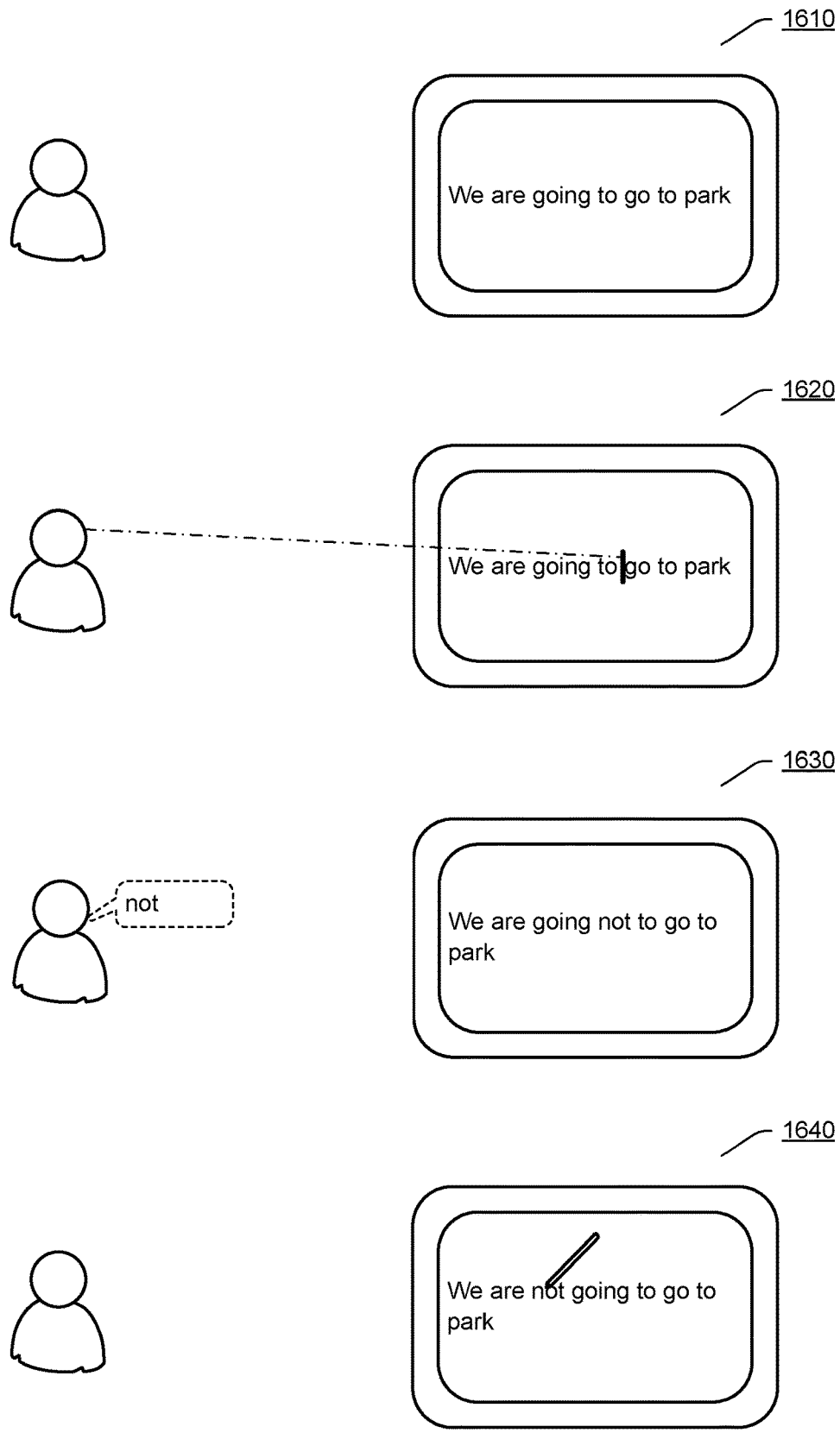
FIG. 16 illustrates an exemplary scenario implemented based on an exemplary method of FIG. 15 according to an embodiment.

FIG. 16 illustrates an exemplary scenario implemented based on an exemplary method of FIG. 15 according to an embodiment. In the exemplary scenario, a user may edit word content in a document created by the application 160, for example, inserting content in the document and thus adjusting location of the inserted content.

At 1610, it may present content "We are going to go to park" already existed in the current document.

At 1620, the user may provide a first input by gaze to indicate a location for inserting content in the document. The computing device 100 may identify that the first input may be inputted through gaze input modality, and may receive the first input via the gaze input modality interface 147 of FIG. 1. In the scenario, type of the first input may be identified as location indication command, and the indicated location may be determined located between "are going to" and "go to" based on the location indication command.

At 1630, the user may speak "not" by voice as a second input. The computing device 100 may identify that the second input may be inputted through voice input modality, and the second input may be received via the voice input modality interface 145 of FIG. 1. In this scenario, type of the second input may be identified as content. The computing device 100 may transform the content "not" in the second input to a text and insert it at the determined location.

At 1640, the user may adjust the location of the inserted content "not" by a third input with pen. The computing device 100 may identify that the third input may be inputted through pen input modality, and the third input may be received via the pen input modality interface 141 of FIG. 1. In the scenario, type of the third input may be identified as edit command, for example, a location adjustment command. Therefore, the computing device 100 may adjust the inserted content "not" from a location between "are going to" and "go to" to "We" and "are going to" based on the location adjustment command.

It should be appreciated that, input modalities, type, content, command etc., shown in scenario of FIG. 16 are exemplary, and may be replaced at random in other implementations.

Figure 17:
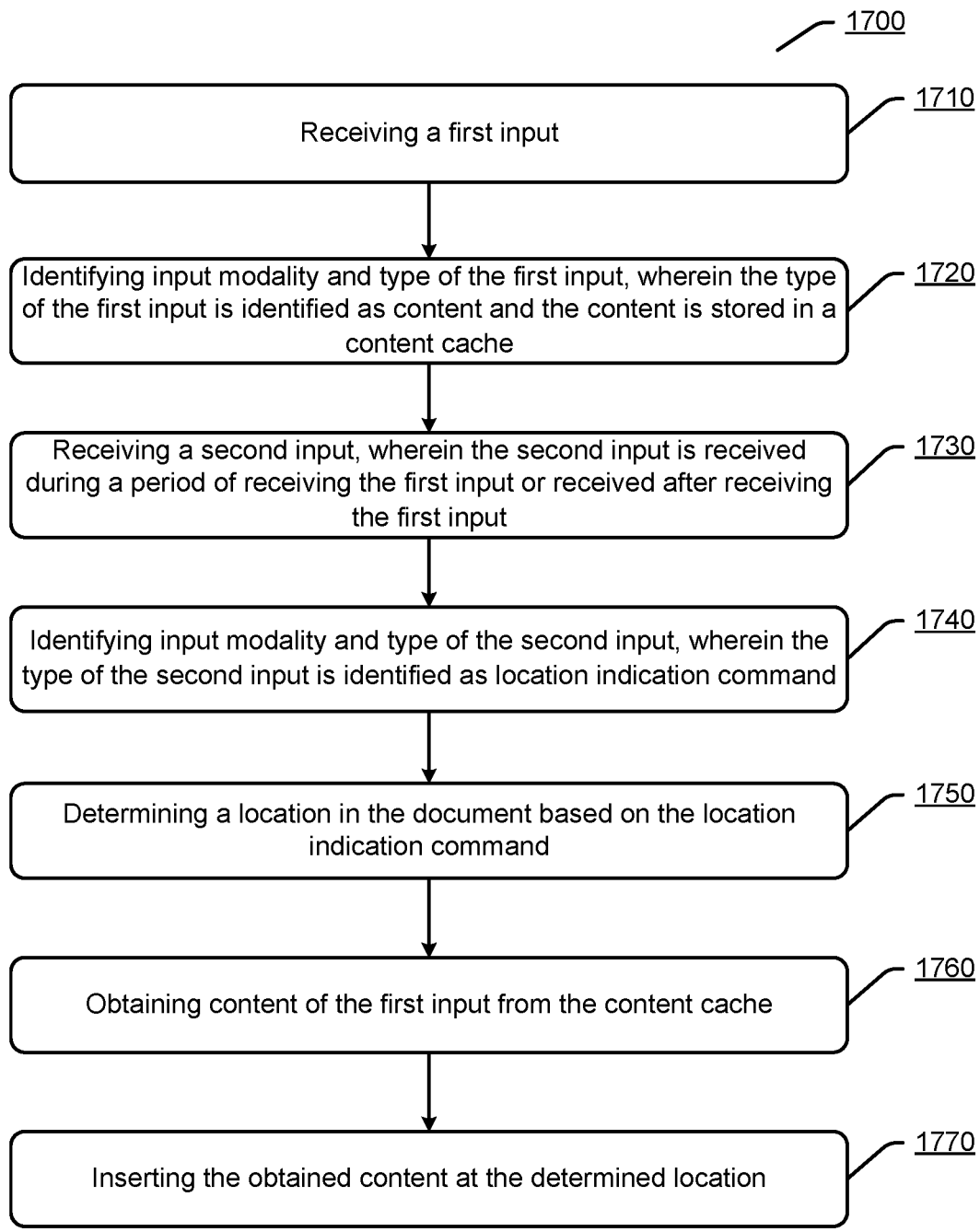
FIG. 17 illustrates a flowchart of an exemplary method for processing a document through a plurality of input modalities according to an embodiment.

FIG. 17 illustrates a flowchart of an exemplary method 1700 for processing a document through a plurality of input modalities according to an embodiment.

At 1710, a first input may be received, in which the first input may be inputted to the computing device 100 by a user through any one of a plurality of input modalities.

At 1720, input modality and type of the first input may be identified. In this embodiment, type of the first input may be identified as content, and the content may be stored in a content cache.

At 1730, a second input may be received, in which the second input may be inputted to the computing device 100 through any one of the plurality of input modalities, and the second input may be received during a period of receiving the first input or received after receiving the first input.

At 1740, input modality and type of the second input may be identified. In this embodiment, type of the second input may be identified as location indication command.

At 1750, a location may be determined in the document based on the location indication.

At 1760, it may obtain content of the first input from the content cache.

At 1770, the obtained content may be inserted at the determined location.

FIG. 18 illustrates an exemplary scenario implemented based on an exemplary method of FIG. 17 according to an embodiment. In this exemplary scenario, a user may add new word content in a document created by the application 160, for example, content to be inserted of a user input may be received and stored firstly and added into the document after the user selecting an inserting location.

At 1810, it may present two pieces of contents already existed in a current document: a first piece is "Tomorrow is a sunny day. Would you like to go out and play with us?"; and a second piece is "We may go out by bike".

At 1820, the user may speak "to be inserted: We are going to go to park" by voice as a first input, to indicate that "We are going to go to park" is content to be inserted. The computing device 100 may identify that the first input may be inputted through voice input modality, and the first input may be received via the voice input modality interface 145 of FIG. 1. In this scenario, type of the first input may be identified content with an inserting mark, in which voice segment "to be inserted" in the first input is an inserting mark, and voice segment "We are going to go to park" in the first input is the content to be inserted. The content "We are going to go to park" to be inserted may be transformed to text and stored in the content cache.

At 1830, the user may provide a second input, in which a sign "A" may be drawn by pen to indicate an inserting location in the document, and a sign "A" may be drawn to indicate content to be inserted at the inserting location. The computing device 100 may identify that the second input may be inputted through pen input modality, and the second input may be received via the pen input modality interface 141 of FIG. 1. In the scenario, the second input may be identified as a location indication command, for example, the location indication command indicates an inserting location to which the content to be inserted may be added. As shown at 1830, the location indication command indicates that the inserting location to which the content to be inserted may be added is located at the end of the first paragraph, i.e., after "?".

At 1840, the computing device 100 may obtain content to be inserted "We are going to go to park" from the content cache, and insert it to the inserting location, that is, after "Would you like to go out and play with us?".

It should be appreciated that, input modalities, type, content, command etc., shown in scenario of FIG. 18 are exemplary, and may be replaced at random in other implementations.

Figure 19:
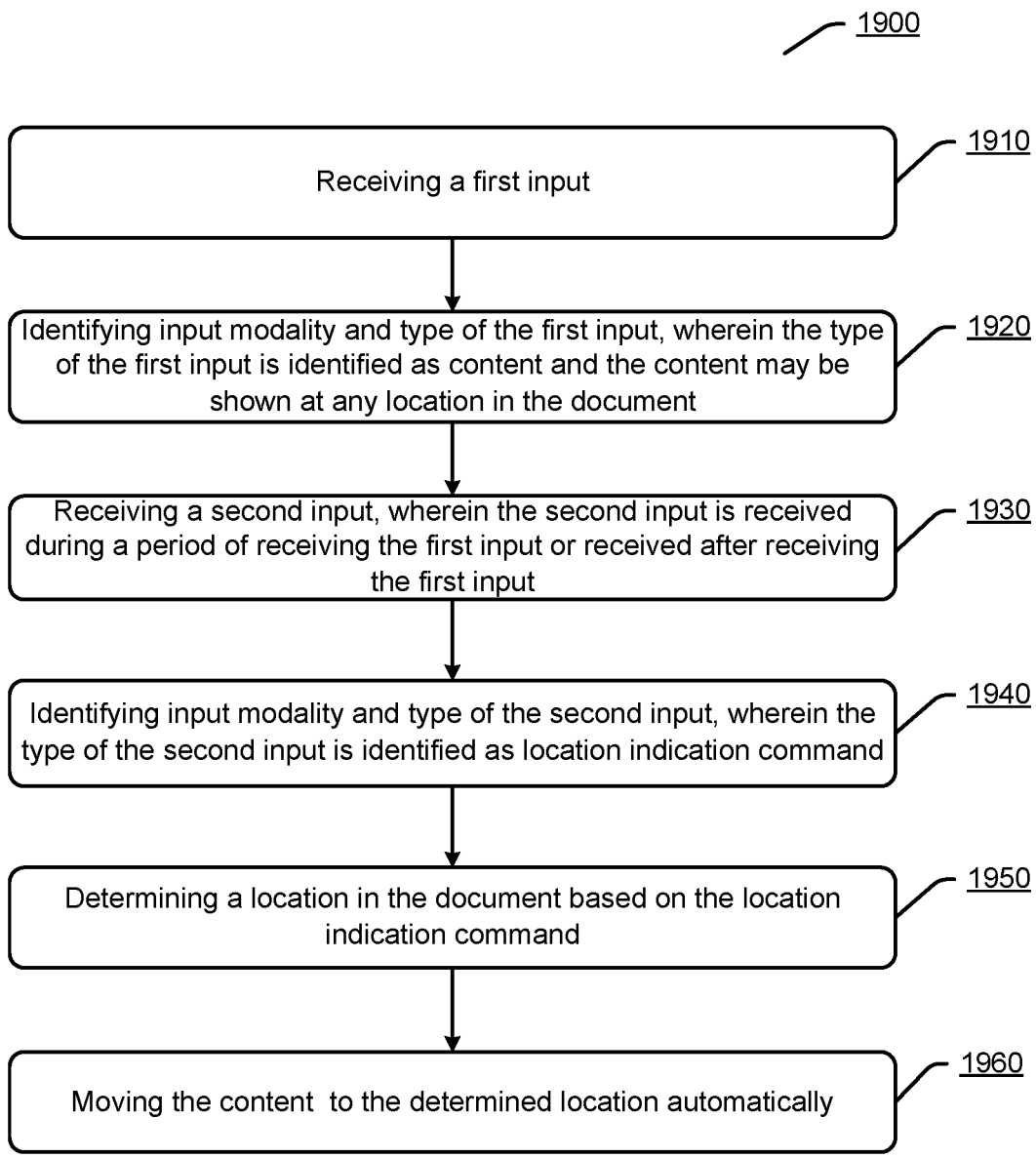
FIG. 19 illustrates a flowchart of an exemplary method for processing a document through a plurality of input modalities according to an embodiment.

FIG. 19 illustrates a flowchart of an exemplary method 1900 for processing a document through a plurality of input modalities according to an embodiment.

At 1910, a first input may be received, in which the first input may be inputted to the computing device 100 by a user through any one of a plurality of input modalities.

At 1920, input modality and type of the first input may be identified. In this embodiment, type of the first input may be identified as content, and the content may be shown at any location in the document.

At 1930, a second input may be received, in which the second input may be inputted to the computing device 100 by the user through any one of a plurality of input modalities, and the second input may be received during a period of receiving the first input or received after receiving the first input.

At 1940, input modality and type of the second input may be identified. In this embodiment, type of the second input may be identified as location indication command.

At 1950, the location may be determined in the document based on the location indication command.

At 1960, the content may be moved to the determined location automatically.

FIG. 20 illustrates an exemplary scenario implemented based on an exemplary method of FIG. 19 according to an embodiment. In the exemplary scenario, the user may add new word content to a document created by the application 160, for example, content to be inserted of a user input may be received and shown firstly and added into the document after the user selecting an inserting location.

At 2010, it may present two pieces of contents already existed in a current document: a first piece is "Tomorrow is a sunny day. Would you like to go out and play with us?"; and a second piece is "We may go out by bike".

At 2020, the user may write "A We are going to go to park" by pen as a first input, to indicate that "We are going to go to park" is content to be inserted. The computing device 100 may identify that the first input may be inputted through pen input modality, and the first input may be received via the pen input modality interface 141 of FIG. 1. In this scenario, type of the first input may be identified as content with an inserting mark, in which "A" in the first input is an inserting mark, and "We are going to go to park" in the first input is content to be inserted. It should be understood that although the first input shown at 2020 is written at the end of the document, in the practice, the user may write the first input at any location in the document.

At 2030, the user may speak "the inserting location is at the end of the first paragraph" by voice, as a second input, to indicate the inserting location in the document. The computing device 100 may identify that the second input may be inputted through voice input modality, and the second input may be received via the voice input modality interface 145 of FIG. 1. In this scenario, the second input may be identified as location indication command, for example, the location indication command indicate that the inserting location to which the content to be inserted may be added is at the end of the first paragraph.

At 2040, the computing device 100 may move the content "We are going to go to park" to be inserted written at any location in the document automatically to the inserting location, that is, after "Would you like to go out and play with us?" in the first paragraph.

It should be appreciated that, input modalities, type, content, command etc., shown in scenario of FIG. 20 are exemplary, and may be replaced at random in other implementations.

All scenarios for processing document discussed above are merely exemplary, and there may be any other scenarios according to the embodiments of the present disclosure.

Figure 21:
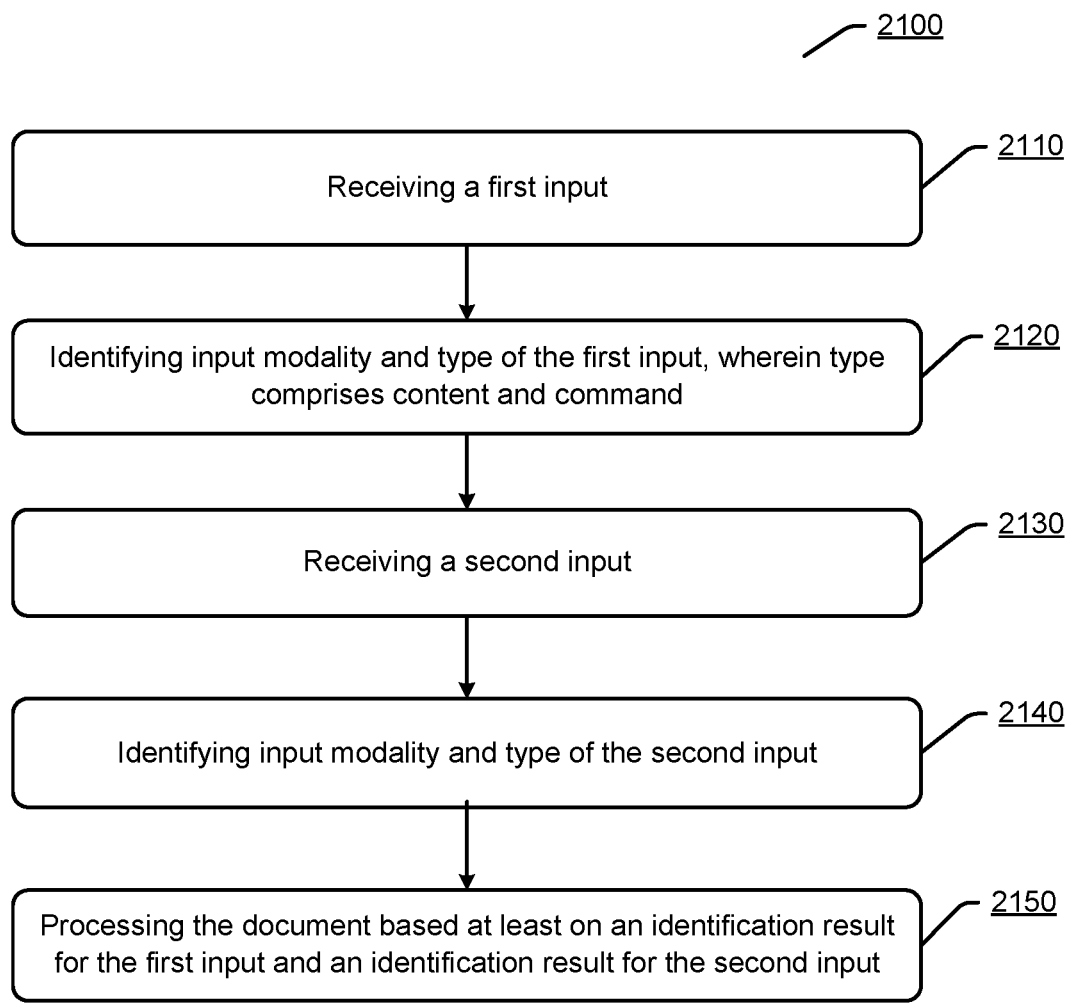
FIG. 21 illustrates a flowchart of an exemplary method for processing a document through a plurality of input modalities according to an embodiment.

FIG. 21 illustrates a flowchart of an exemplary method 2100 for processing a document through a plurality of input modalities according to an embodiment.

At 2110, a first input may be received, in which the first input may be inputted to the computing device 100 by a user through any one of a plurality of input modalities.

At 2120, input modality and type of the first input may be identified. The type may comprise content and command types.

At 2130, a second input may be received, in which the second input may be inputted to the computing device 100 by the user through any one of a plurality of input modalities.

At 2140, input modality and type of the second input may be identified.

At 2150, the document may be processed based at least on an identification result for the first input and an identification result for the second input.

In one implementation, the plurality of input modalities may include one or more of: finger input modality, pen input modality, voice input modality, soft-keyboard input modality and gaze input modality.

In one implementation, the second input may be received outside of a period of receiving the first input.

In one implementation, receiving of the second input may be began during a period of receiving the first input. In one case, the type of the first input may be identified as content, the type of the second input may be identified as command, and the processing the document further comprises: processing, based on the command, portions of the content which are received since a predefined period after receiving the whole second input, when the whole second input is received during a period of receiving the first input. In another case, the type of the first input may be identified as content, the type of the second input may be identified as command, and processing the document further comprises: processing the whole content based on the command, when the whole second input is received after a period of receiving the first input.

In one implementation, the method may further comprise: receiving a third input; identifying input modality and type of the third input; and processing the document further based on an identification result for the third input. In one implementation, receiving of the second input and the third input is began during a period of receiving the first input.

In one implementation, the type of the first input may be identified as content selection command, the type of the second input may be identified as edit command, and processing the document further comprises: selecting content in the document based on the content selection command; and editing the selected content based on the edit command, wherein the edit command may include one or more of: deletion, addition, replacement, format adjustment, location adjustment and layout adjustment. In one case, the edit command may include a replacement command. The method may further comprise: receiving a third input; and identifying input modality and type of the third input, wherein the type of the third input is identified as another content, and editing the selected content based on the edit command may further comprise replacing the selected content by the another content based on the replacement command. In another case, the edit command may include a replacement command, and the method may further comprise: receiving a third input; and identifying input modality and type of the third input, wherein the type of the third input may be identified as obtaining command for indicating to obtain another content, and editing the selected content based on the edit command may further comprise: obtaining the another content based on the obtaining command, and replacing the selected content by the another content based on the replacement command.

In one implementation, the input modality of the first input may be identified as gaze input modality, the type of the first input may be identified as location indication command, and the type of the second input may be identified as content. Processing the document may further comprise: determining a location in the document based on the location indication command, and inserting the content at the determined location. In one case, the method may further comprise: receiving a third input, and identifying input modality and type of the third input, wherein the type of the third input may be identified as edit command, and processing the document may further comprise editing the inserted content based on the edit command, the edit command including one or more of: deletion, addition, replacement, format adjustment, location adjustment and layout adjustment.

In one implementation, the type of the first input may be identified as content, wherein the content may be stored in a content cache. Further, the type of the second input may be identified as location indication command, wherein the second input may be received during a period of receiving the first input or after the first input was received. Processing the document may further comprise: determining a location in the document based on the location indication command; obtaining the content from the content cache; and inserting the content at the determined location.

In one implementation, the type of the first input may be identified as content, wherein the content may be presented at any location in the document. The type of the second input may be identified as location indication command, wherein the second input may be received during a period of receiving the first input or after the first input was received. Processing the document may further comprise: determining a location in the document based on the location indication command; and moving the content to the determined location automatically.

It should be appreciated that the method 2100 may further comprise any steps/processes for processing a document through a plurality of input modalities according to the embodiments of the present disclosure as mentioned above.

Figure 22:
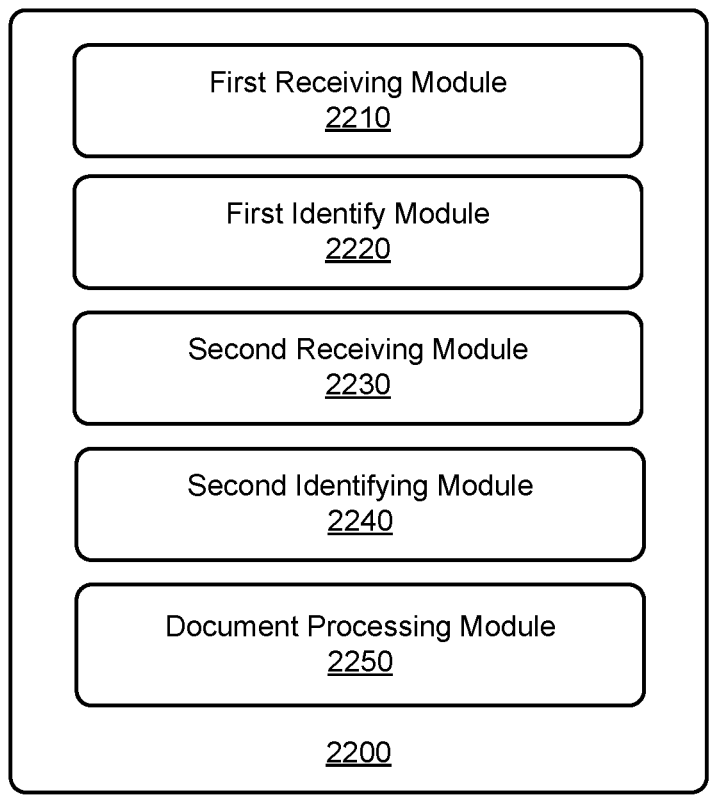
FIG. 22 illustrates an exemplary apparatus for processing a document through a plurality of input modalities according to an embodiment.

FIG. 22 illustrates an exemplary apparatus 2200 for processing a document through a plurality of input modalities according to an embodiment.

The apparatus 2200 may comprise: a first receiving module 2210, for receiving a first input; a first identifying module 2220, for identifying input modality and type of the first input, wherein the type includes command and content; a second receiving module 2230, for receiving a second input; a second identifying module 2240, for identifying input modality and type of the second input; and a document processing module 2250, for processing the document based at least on an identification result for the first input and an identification result for the second input.

In one implementation, the second receiving module 2230 may begin to receive the second input during a period of receiving the first input.

In one implementation, the apparatus may further comprise: a third receiving module, for receiving a third input; and a third identifying module, for identifying input modality and type of the third input, wherein the document processing module 2250 may process the document further based on an identification result for the third input. In one case, the second receiving module 2230 may begin to receive the second input during a period of receiving the first input, and the third receiving module may begin to receive the third input during the period of receiving the first input.

It should be appreciated that the apparatus 2200 may further comprise any other modules configured for performing any step/process for processing document through a plurality of input modalities according to the embodiments of the present disclosure as mentioned above.

Figure 23:
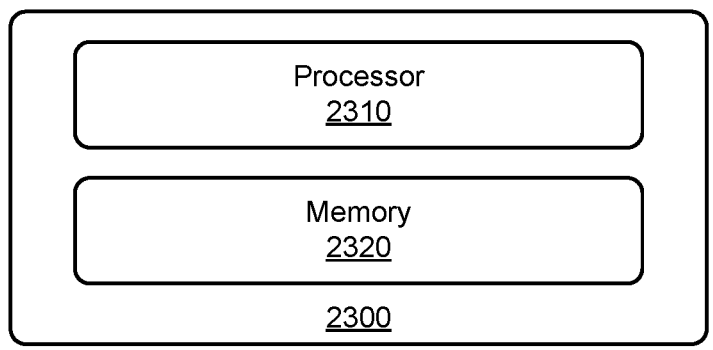
FIG. 23 illustrates an exemplary apparatus for processing a document through a plurality of input modalities according to an embodiment.

FIG. 23 illustrates an exemplary apparatus 2300 for processing a document through a plurality of input modalities according to an embodiment. The apparatus 2300 may comprise one or more processors 2310 and a memory 2320 storing computer-executable instructions. The computer-executable instructions, when executed, cause the one or more processors 2310 to: receive a first input; identify input modality and type of the first input, wherein the type may include command and content; receive a second input; identify input modality and type of the second input; and process the document based at least on an identification result for the first input and an identification result for the second input.

The embodiments of the present disclosure may be embodied in a non-transitory computer-readable medium. The non-transitory computer-readable medium may comprise instructions that, when executed, cause one or more processors to perform any operations of the methods for processing a document through a plurality of input modalities according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

The invention claimed is:

1. A method for processing a document through a plurality of input modalities, the method comprising:
   receiving a first input during a first period of time;
   identifying input modality and type of the first input, wherein the type includes command and content;
   receiving a second input during at second period of time, wherein the first period of e and the second period of time at least partially overlap
   wherein the second period of time begins during the first period of time, and the second period of time concludes after the first period of time concludes;
   identifying input modality and type of the second input, wherein the second input comprises a different input modality than the first input,
   wherein the type of one of the first and second inputs is identified as location indication command, and the type of the other of the first and second inputs is identified as content; and
   processing the document based at least on an identification result for the first input and an identification result for the second input.

2. The method of claim 1, wherein the receiving of the second input overlaps with receiving the first input.

3. The method of claim 2, wherein,
   the type of the first input is identified as content,
   the type of the second input is identified as command, and
   the processing the document further comprises:
   processing, based on the command, portions of the content which are received since a predefined period after receiving the whole second input, when the whole second input is received during a period of receiving the first input.

4. The method of claim 2, wherein,
   the type of the first input is identified as content,
   the type of the second input is identified as command, and
   the processing the document further comprises:
   processing the whole content based on the command, when the whole second input is received after a period of receiving the first input.

5. The method of claim 1, further comprising:
   receiving a third input;
   identifying input modality and type of the third input; and
   processing the document further based on an identification result for the third input.

6. The method of claim 5, wherein the receiving of the second input and the third input is began during a period of receiving the first input.

7. The method of claim 1, wherein,
   the input modality of the first input is identified as gaze input modality,
   the type of the first input is identified as location indication command,
   the type of the second input is identified as content, and
   the processing the document further comprises:
   determining a location in the document based on the location indication command; and
   inserting the content at the determined location.

8. The method of claim 7, further comprising:
   receiving a third input; and
   identifying input modality and type of the third input, wherein the type of the third input is identified as edit command,
   wherein the processing the document further comprises editing the inserted content based on the edit command, the edit command including one or more of: deletion, addition, replacement, format adjustment, location adjustment and layout adjustment.

9. The method of claim 1, wherein,
   the type of the first input is identified as content, wherein the content is stored in a content cache,
   the type of the second input is identified as location indication command,
   the second input is received during a period of receiving the first input or after the first input was received, and
   the processing the document further comprises:
   determining a location in the document based on the location indication command;
   obtaining the content from the content cache; and
   inserting the content at the determined location.

10. The method of claim 1, wherein,
    the type of the first input is identified as content, wherein the content is presented at any location in the document,
    the type of the second input is identified as location indication command,
    the second input is received during a period of receiving the first input or after the first input was received, and
    the processing the document further comprises:
    determining a location in the document based on the location indication mind; and
    moving the content to the determined location automatically.

11. An apparatus for processing a document through a plurality of input modalities, comprising:
    one or more processors; and
    a memory storing computer-executable instructions that, when executed, cause the one or more processors to:
    receive a first input during a first period of time;
    identify input modality and type of the first input, wherein the type includes command and content;
    receive a second input during a second period of time, wherein the first period of time and the second period of time at least partially overlap
    wherein the second period of time begins during the first period of time, and the second period of time concludes after the first period of time concludes;

identify input modality and type of the second input, wherein the second input comprises a different input modality than the first input, wherein the type of one of the first and second inputs is identified as location indication command, and the type of the other of the first and second inputs is identified as content; and process the document based at least on an identification result for the first input and an identification result for the second input.

* * * * *